(12) United States Patent
LeCrone et al.

(10) Patent No.: US 11,010,060 B2
(45) Date of Patent: May 18, 2021

(54) HIGH PERFORMANCE LOGICAL DEVICE

(71) Applicant: EMC IP Holding Company LLC, Hopkinton, MA (US)

(72) Inventors: Douglas E. LeCrone, Hopkinton, MA (US); Michael J. Scharland, Franklin, MA (US); Steven T. McClure, Northboro, MA (US); Jerome Cartmell, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/446,679

(22) Filed: Jun. 20, 2019

(65) Prior Publication Data
US 2019/0303017 A1 Oct. 3, 2019

Related U.S. Application Data

(63) Continuation of application No. 15/499,276, filed on Apr. 27, 2017, now Pat. No. 10,372,345.

(51) Int. Cl.
*G06F 3/06* (2006.01)
(52) U.S. Cl.
CPC ............ *G06F 3/0611* (2013.01); *G06F 3/065* (2013.01); *G06F 3/067* (2013.01); *G06F 3/0619* (2013.01); *G06F 3/0659* (2013.01)
(58) Field of Classification Search
CPC ...... G06F 3/0611; G06F 3/0619; G06F 3/065; G06F 3/0659; G06F 3/067; G06F 12/0895
See application file for complete search history.

(56) References Cited

U.S. PATENT DOCUMENTS

| | | | | |
|---|---|---|---|---|
| 7,925,829 | B1 * | 4/2011 | Michael | G06F 3/0605 711/114 |
| 7,945,758 | B1 * | 5/2011 | Michael | G06F 3/0607 711/114 |
| 8,281,033 | B1 * | 10/2012 | Riordan | G06F 3/061 709/231 |
| 8,601,085 | B1 * | 12/2013 | Ives | G06F 3/061 709/211 |
| 8,959,305 | B1 * | 2/2015 | Lecrone | G06F 12/023 707/813 |
| 2019/0050337 | A1 * | 2/2019 | Kaga | G06F 11/3034 |

FOREIGN PATENT DOCUMENTS

WO    WO-2018011844 A1 *  1/2018   ......... G06F 12/0817

* cited by examiner

*Primary Examiner* — Aracelis Ruiz
(74) *Attorney, Agent, or Firm* — Muirhead and Saturnelli, LLC

(57) ABSTRACT

A high performance logical device having low latency may be provided. I/Os to the logical device may be sent only to a primary director having sole ownership of the logical device. The primary director may perform operations locally for the logical device. Such operations may include allocating global memory for use with the logical device from only a global memory portion that is local to the primary director. The global memory may be a distributed global memory including memory from multiple directors and possibly multiple engines. Cached data for the logical device may be mirrored automatically by the data storage system. Alternatively, the cached data for the logical device may be mirrored using a host-based mirroring technique.

21 Claims, 18 Drawing Sheets

| Director # 502 | MD structures 504 | User data cache slots 506 |
|---|---|---|
| 1 | 510a | 512a |
| 2 | 510b | 512b |
| 3 | 510c | 512c |
| 4 | 510d | 512d |
| .. | .. | .. |
| 16 | 510m | 512m |

FIG. 8

HIGH PERFORMANCE LOGICAL DEVICE

BACKGROUND

Technical Field

This application generally relates to data storage and more particularly to techniques used in connection with providing a high performance or low latency logical device.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations.

SUMMARY OF THE INVENTION

In accordance with one aspect of techniques herein is a method of processing an I/O operation comprising: receiving, on a host, the I/O operation directed to a target location of a logical device having storage provisioned on a data storage system; determining, by the host, a director of the data storage system, wherein the director is designated as a primary director for the logical device and wherein the primary director locally accesses a first cache location of the cache of the data storage system, wherein the first cache location is used to store cache data for the target location of the logical device; and sending the I/O operation from the host to the data storage system over a path, said path being a connection from the host to the director of the data storage system. The target address may denote a logical address or location on the logical device. The primary director may be a specified one of a plurality of directors of the data storage system that exclusively processes I/O operations directed to the logical device. The first cache location may be included in a first global memory portion that is local with respect to the director. The data storage system may include a distributed global memory comprising a plurality of global memory portions including the first global memory portion. Each of the plurality of directors may locally access a different one of the plurality of global memory portions. The cache of the data storage system may comprise groups of multiple cache locations, where each of the groups of multiple cache locations may be included in a different one of the global memory portions. The logical device may be configured as a high performance logical device. Memory chunks allocated from global memory for use with the logical device may be only allocated from the first global portion of the distributed global memory. The primary director may be the only one of the plurality of directors that accesses the memory chunks and the controls used in connection with shared or concurrent access to the memory chunks may be disabled. The primary director may be included in a first engine and a second director may also be included in the first engine. The plurality of global memory portions of the distributed global memory may include a second global memory portion that is local with respect to the second director. The data storage system may automatically perform processing to mirror first cached write data of the logical device in the first global memory portion and the second global memory portion. The processing may include copying the first cached write data over a first connection used for transferring data between directors and global memory portions of the distributed global memory of the first engine. The data storage system may include a plurality of engines including the first engine. A second logical device may not be configured as a high performance logical device, wherein the data storage system may automatically perform second processing to mirror second cached write data of the second logical device on two different cache locations of two different engines of the plurality of engines. The second processing may include copying the second cached write data over a communications fabric connected to each of the plurality of directors and each of the plurality of global memory portions of the distributed global memory. The primary director may be included in a first engine and a second director may also be included in the first engine. The plurality of global memory portions of the distributed global memory may include a second global memory portion that is local with respect to the second director. Host-based processing may be performed to mirror first cached write data of the logical device in the first global memory portion and the second global memory portion. The first cached write data may include first data written to the logical device by the I/O operation, and wherein the director may store the first data in the first cache location of the first global memory portion. The host-based processing may include the host performing first processing including: determining, by a driver on the host, whether the I/O operation is a write operation and whether the logical device, to which the I/O operation is directed, is designated as a high performance logical device; and responsive to determining the I/O operation is a write operation and the logical device, to which the I/O operation is directed, is designated as a high performance logical device, performing additional processing including sending a second write operation that also writes the first data in another cache location of one of the plurality of global memory portions. The second write operation may be sent to the second director that stores the first data in a cache location of the second global memory portion local to the second director. The data storage system may include a plurality of directors on a plurality of engines. Each of the plurality of engines may include at least two of the plurality of directors, wherein a first of the engines may include the director and a second director. Each of the plurality of directors may be configured to communicate over a fabric to access a distributed global memory of a plurality of global memory portions. Each of the plurality of global memory portions may be local to a different one of the plurality of directors. Each of the plurality of engines may include an engine-local connection used for communication between any of the plurality of directors on said each engine. A first of the plurality of global memory portions may be local to the director and a second of the plurality of global memory portions may be local to the second director. The logical device may be configured as a high performance logical device. The data storage system may automatically mirroring cached write data of the logical device in the first global memory portion and the second global memory portion. The mirroring may include transferring the cached write data of the logical device, as stored in the first global memory portion, over the engine-local connection of the first engine, to the second global memory portion.

In accordance with another aspect of the techniques herein is a system comprising: a processor; and a memory including code stored therein that, when executed by the processor, performs a method of processing an I/O operation comprising: receiving, on a host, the I/O operation directed to a target location of a logical device having storage provisioned on a data storage system; determining, by the host, a director of the data storage system, wherein the director is designated as a primary director for the logical device and wherein the primary director locally accesses a first cache location of the cache of the data storage system, wherein the first cache location is used to store cache data for the target location of the logical device; and sending the I/O operation from the host to the data storage system over a path, said path being a connection from the host to the director of the data storage system.

In accordance with another aspect of techniques herein is a computer readable medium comprising code stored thereon, that, when executed, performs a method of processing an I/O operation comprising: receiving, on a host, the I/O operation directed to a target location of a logical device having storage provisioned on a data storage system; determining, by the host, a director of the data storage system, wherein the director is designated as a primary director for the logical device and wherein the primary director locally accesses a first cache location of the cache of the data storage system, wherein the first cache location is used to store cache data for the target location of the logical device; and sending the I/O operation from the host to the data storage system over a path, said path being a connection from the host to the director of the data storage system. The logical device may be configured as a high performance logical device and the primary director may be the only one of the plurality of directors that receives and processes I/O operations, directed to the logical device, from the host. The host may perform processing to send the I/O operations directed to the logical device only to the primary director. Memory chunks allocated from global memory for use with the logical device may only be allocated from a first global portion of a distributed global memory of the data storage system. The first global portion may be memory that is locally accessible to the primary director. Cached write data for the logical device may be stored in the first global portion and first processing may be performed to mirror the cached write data for the logical device. The first processing may include any of: performing automated processing by the data storage system to mirror the cached write data for the logical device in a second global memory portion of the distributed global memory, wherein the second global memory portion is locally accessible to a second director in a same engine as the primary director and wherein the cached write data is copied to the second global memory portion over a first engine-local connection between the primary director and the second director; and performing host-based mirroring in which the host performs processing to mirror the cached write data for the logical device. Automated processing may be performed by the data storage system to mirror the cached write data for the logical device in the second global memory portion. Upon failure of the primary director, the host may send subsequent I/Os that are directed to the logical device over one or more other paths to the second director. Second processing may be performed to mirror cached write data of the subsequent I/Os. The second processing may include performing host-based mirroring, or reconfiguring the logical device as a regular logical device whereby cached write data is mirrored in cache locations of one or more global memory portions across multiple engines.

BRIEF DESCRIPTION OF THE DRAWINGS

Features and advantages of the present invention will become more apparent from the following detailed description of exemplary embodiments thereof taken in conjunction with the accompanying drawings in which:

FIG. 8 is an example illustrating a logical representation of cached data portions collectively stored in the global memory portions of the directors of a data storage system in an embodiment in accordance with techniques herein;

DETAILED DESCRIPTION OF EMBODIMENT(S)

Figure 1:
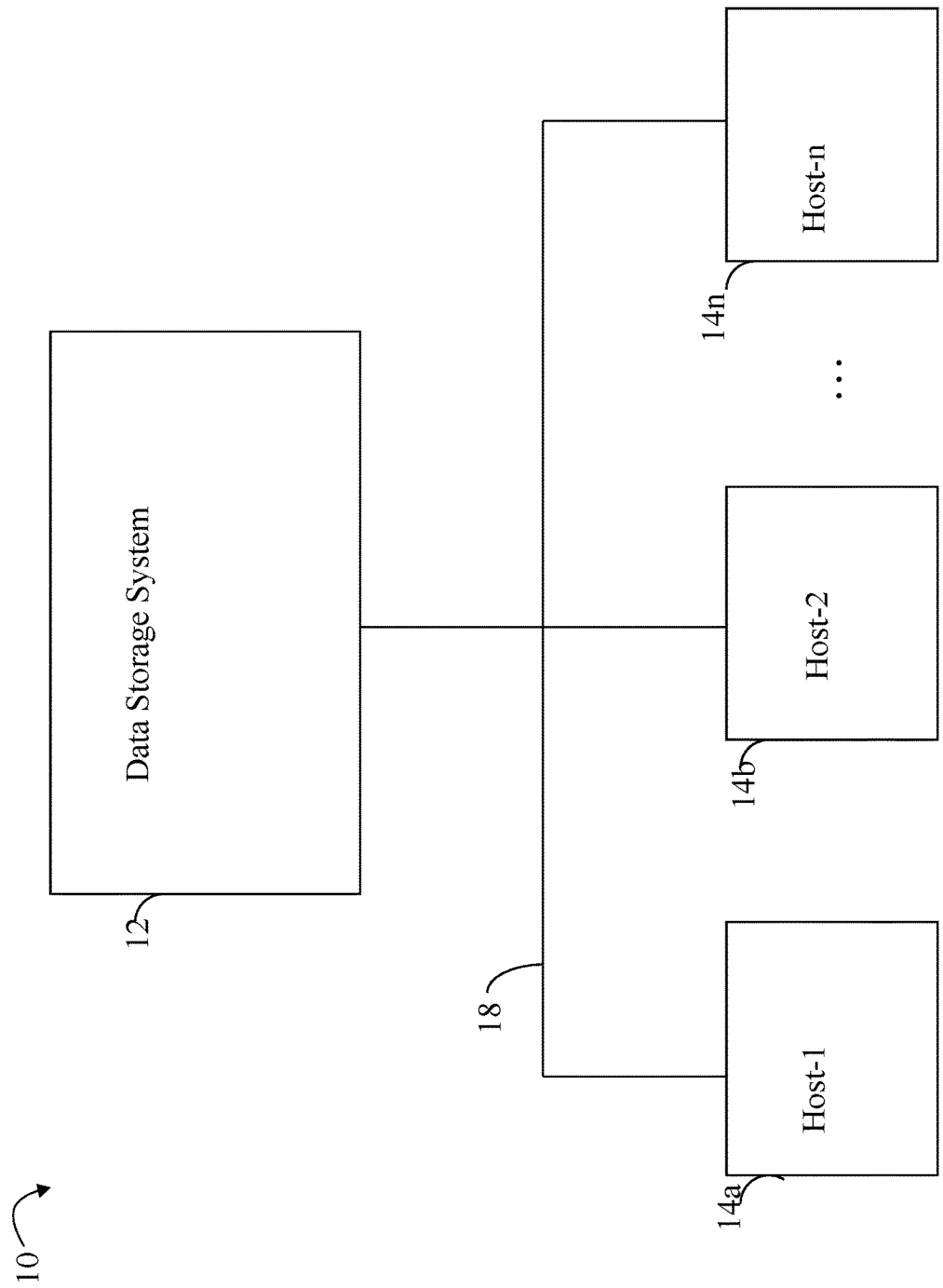
FIGS. 1, 3 and 4 are examples of embodiments of systems and components that may utilize the techniques described herein.

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, an IBM mainframe computer system (e.g., such as the z/ Architecture as described in more detail elsewhere herein), or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, FICON, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
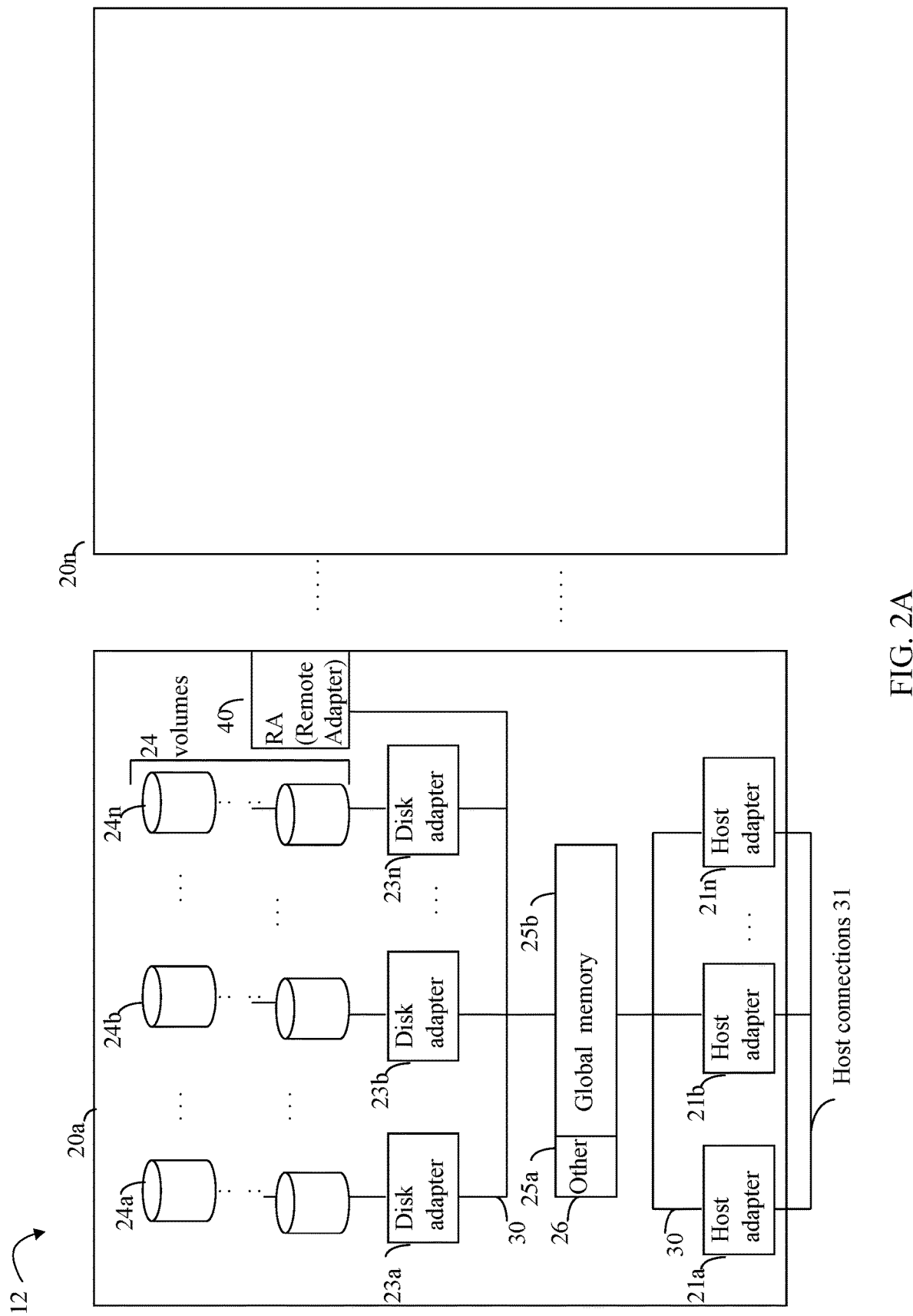
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes (more generally physical storage devices), in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other, more generally, other front end adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by Dell Inc. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations (e.g., read and write I/O operations) using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. For example, one or more logical devices or volumes may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated physical storage devices or drive(s) and logical devices residing thereon.

I/O requests, such as read and write requests sent from a host to the data storage system, may be directed to a target address, such as a logical device and location on the logical device. The target address may be mapped or translated into a corresponding physical storage location on physical storage storing the data for the corresponding target address. Such I/O requests from the host may be received by a front end director or adapter, such as the HA or FA described herein. The receiving FA may perform processing to service the I/O operation. Global memory, or a subset thereof, on the data storage system, may be used as the data cache (also referred to as simply as a cache herein). In at least one embodiment, write data received at the data storage system from a host or other client may be initially written to the cache (e.g., cache memory such as may be included in the component designated as 25b) and marked as write pending (WP). Once written to cache, the write operation may be notified that the write operation has completed. At a later point time, the write data marked as WP may be destaged from cache to the physical storage device, such as by a DA. If the I/O operation is a read request to read data from a logical device location, processing is performed to determine whether the requested read data is already stored in cache thereby resulting in a read hit. If there is a read hit, the FA may retrieve the requested read data from cache and return the requested read data to the host or other client that issued the read. If the read data is not stored in cache resulting in a read miss, a request is issued to retrieve the requested read data from physical storage. Data that is read from physical non-volatile storage devices, such as back-end physical storage devices accessed by the DAs, is then stored in the cache. The FA may retrieve the requested read data now stored in cache and return the requested read data to the host or other client that issued the read.

It should be noted that data storage system global memory, such as denoted by 25b in FIG. 2A, may denote a logical representation of global memory. As described in more detail elsewhere herein, the global memory of the data storage system, such as used in connection with data caching for I/O operations, may be implemented as a distributed global memory with different portions of the global memory local to different corresponding directors or adapters. In such an embodiment, all portions of the global memory may be generally accessible to all directors. Particular one or more portions of the global memory may be local with respect to a particular director with remaining non-local portions of the global memory accessible to the particular director using a communications fabric, such as an Infiniband (IB) fabric. The foregoing as may be included in at least one embodiment of techniques herein is described in more detail below.

Figure 2B:
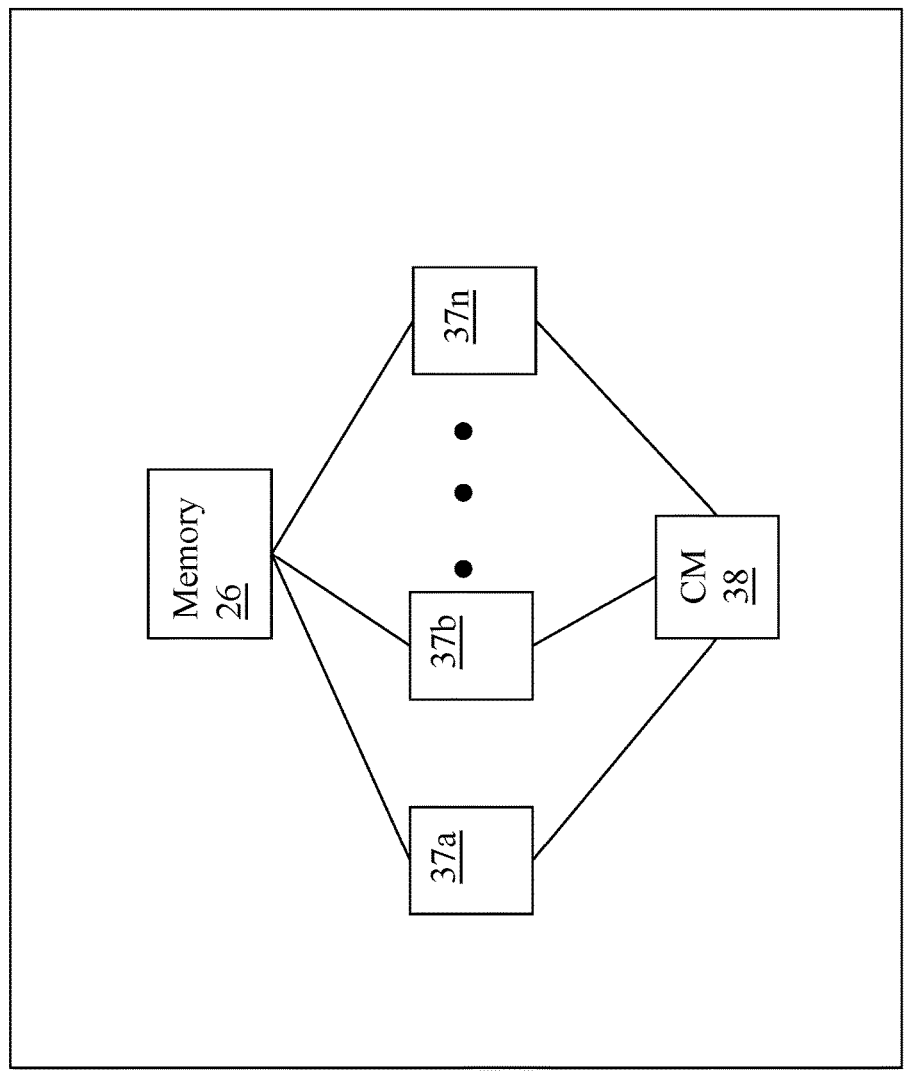
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. The representation of FIG. 2B also includes an optional communication module (CM) 38 that provides an alternative communication path between the directors 37a-37n. Each of the directors 37a-37n may be coupled to the CM 38 so that any one of the directors 37a-37n may send or receive a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending director 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
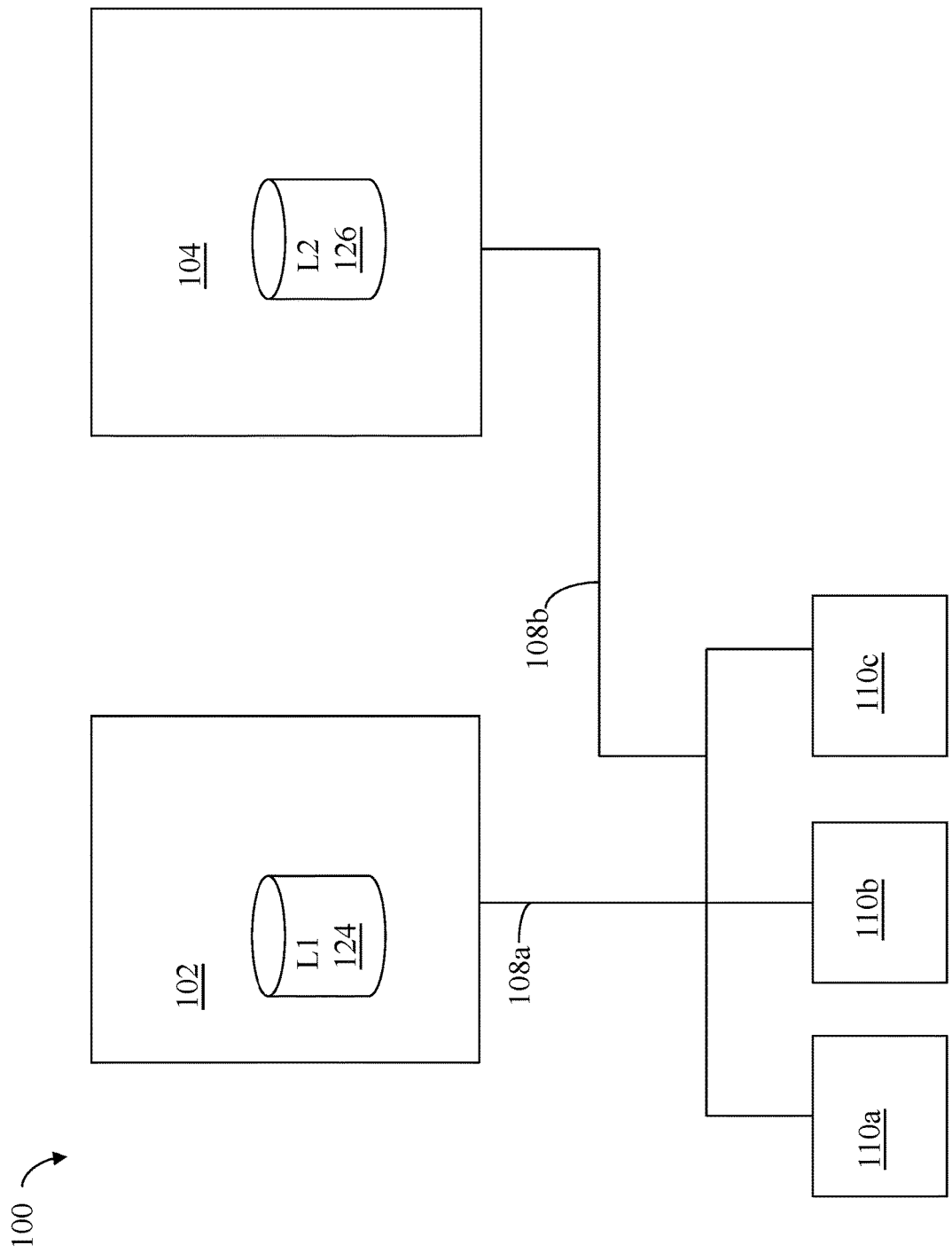

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. Hosts 110a, 110b and 110c may perform operations to data storage system 102 over connection 108a. Also hosts 110a, 110b and 110c may perform operations, such as I/O operations, to data storage system 104 over connection 108b. The hosts 110a, 110b and 110c may be connected to the data storage systems 102, 104 through connections 108a, 108b which may be, for example, network or other type of communication connection. Although not illustrated, the hosts 110a-110c may also be directly connected to a network such as the Internet.

The data storage systems 102 and 104 may include one or more logical devices. In this example, data storage system 102 includes logical device L1 124 and data storage system 104 includes logical device L2 126. Both of the data storage systems may include one or more other logical and/or physical storage devices.

In at least one embodiment, one or more of the hosts 110a-110c may access logical device L1 124 over connection 108a, and one or more of the hosts 110a-110c may access logical device L2 126 over connection 108b. Both the logical devices L1 124 and L2 126 may have a data layout based on the CKD (count key data) architecture and format, and one or more of the hosts 110a-c may access data of devices L1 124 and L2 126 using a FICON connection. IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

Elements 102 and 104 may each be a Symmetrix® data storage system, provided by Dell Inc., which is a data storage system compatible with FICON. For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

CKD may be characterized as a data storage device architecture where each storage device record includes of a count field, an optional key field, and a ("user") data field with error correction/detection information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned above, I/O requests directed to devices in accordance with the CKD format may be in the form of channel programs (also known as channel word programs or chains) including an ordered sequence of channel command words (CCWs); or transport mode (TCW) and the associated device command words (DCWs). Additionally, channel word programs, processing I/O requests, and the like, are described also, for example, in U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); and U.S. Pat. No. 7,707,186, issued Apr. 27, 2010, METHOD AND APPARATUS FOR DATA SET MIGRATION (the '186 patent), all of which are incorporated by reference herein.

The host 110a may issue a command, such as an I/O command to read or write data to logical device L1 124 of data storage system 102. Generally, the I/O command may be issued over a physical connection, path or channel between host 110a and data storage 102 where the logical device L1 124 is accessible to the host over such path. The I/O command may be transmitted from the host 110a and received at a front end adapter or director of the data storage system 102, such as an HA or FA of the data storage system 102. Thus each physical connection, path or channel from the host over which the host accesses the logical device L1 124 may be a path to a particular front end director, such as a particular one of the multiple HAs or FAs of the data storage system 102. In this manner, each of the multiple paths over which the host 110a may access the logical device L1 124 may be to a different one, or a particular one, of the multiple HAs or FAs of the data storage system 102. In at least some embodiments having multiple paths, normal issuance of an I/O operation may include a host selecting one of the multiple paths based on a suitable technique and associated criteria, such as based on current availability of paths at the time of the I/O, round robin or other performance/load balancing technique, and the like.

Figure 4:
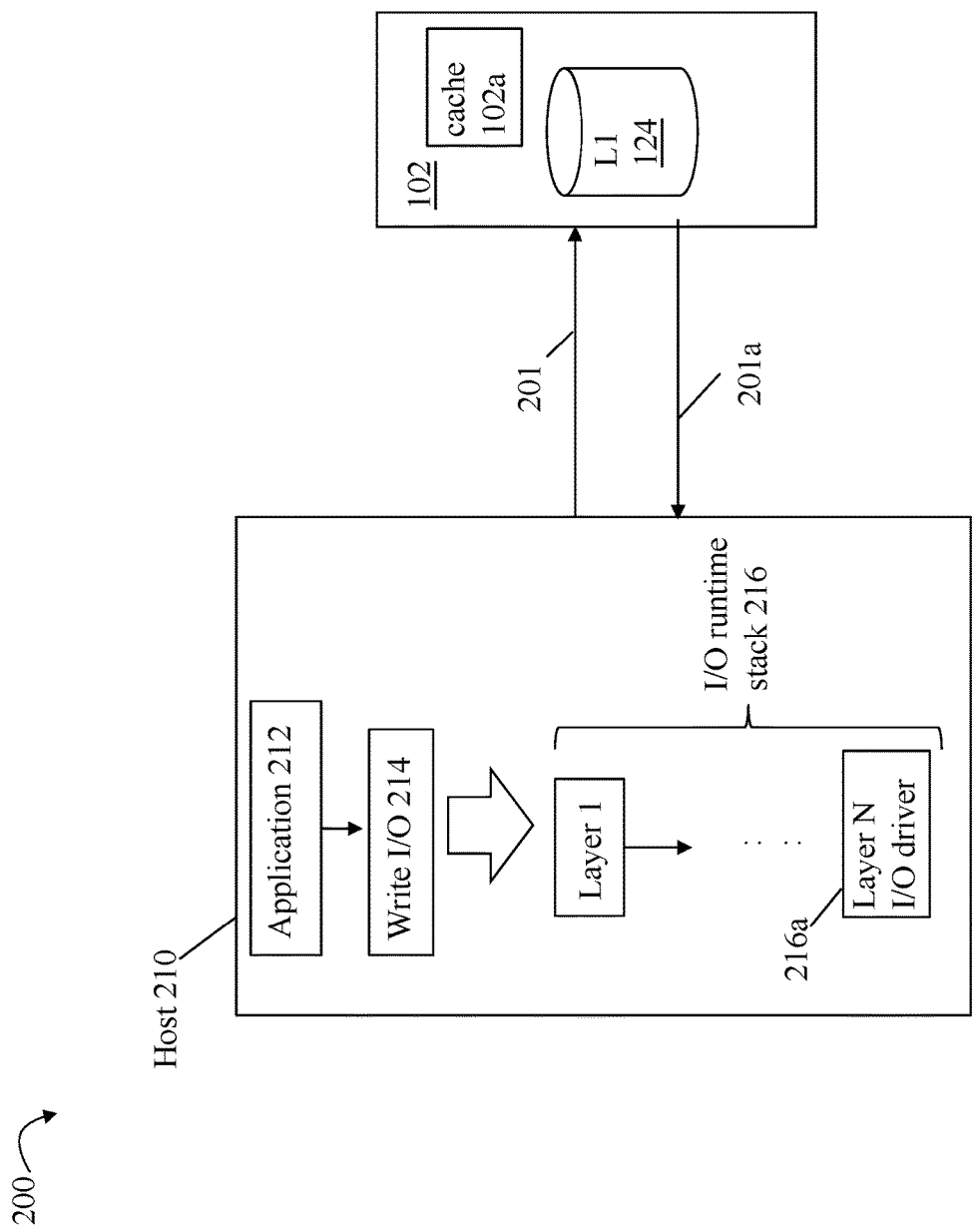

Referring to FIG. 4, shown is an example illustrating components and processing that may be performed in an embodiment in accordance with techniques herein. The example 200 includes host 210 and the data storage system 102. The example 200 provides additional detail in connection with only the single data storage system 102 and single host 210 for purposes of simplicity of illustration. However, more generally, such detail described herein with respect to a single data storage system and single host more generally applies to any one or more data storage systems and any one or more hosts. Element 102 may be as described in connection with FIG. 3 including the L1 logical device 124. The host 210 may be a host similar to the hosts 110a-c and others as described herein. Additionally, the host 210 may include application 212 executing thereon which may issue a write I/O operation 214 that results in modification of data stored at a target location or offset on a logical device such as logical device L1 124.

It should be noted that the write I/O operation 214 may generally denote a modification to any data stored on the logical device at the target location on a logical device. The write operation 214 may be a direct modification of user data, such as a write by the application 212 to update user data stored in a file. Additionally, and more generally, the write operation 214 may denote a modification to user data as well as other types of non-user data stored on the logical device besides user data. Such other types data of the logical device may also include, for example, metadata of the logical device.

Metadata of a logical device that may be modified may include structural information about a data layout of the logical device. For example, the metadata may indicate information such as particular offsets or locations on the logical device where a file system is stored, where each file is stored, where extents or portions of each file are stored, and the like. As a file may increase in size, for example, additional extents may be added to the file whereby such extents of the file may be located at noncontiguous logical offsets or logical addresses of the logical device. In a similar manner, as the file stored on the logical device decreases in size (e.g., such as portions of the file are deleted), the file's metadata stored on the logical device may also change to denote the removed extents. Thus, metadata may be stored at various logical addresses or locations of the logical device where such stored metadata is modified as a result of different operations performed by the application.

In this manner, the write operation 214 may denote generally a write operation that modifies data stored on the logical device whereby the write may modify user data and/or other types of non-user data, such as the metadata, as noted above and elsewhere herein.

The write I/O 214 may result in execution of a sequence of runtime calls or invocations of the I/O path on the host as denoted by the I/O runtime stack 216. Generally, the I/O runtime stack 216 may be characterized as a sequence of layered calls performed to process the write operation 214. Layer 1 may denote the highest layer of the stack 216 and layer N may denote the bottom or lowest layer in the stack 216. As known in the art, the stack 216 may include, for example, a logical volume manager, one or more I/O drivers, and the like. For example, if the write 214 writes user data to a location in a user data file, the stack 216 may include one or more layers that map the particular file location of the user data file to a host side logical device and associated logical device location. Additionally, the stack 216 may include an I/O driver 216a which may be characterized as a low level I/O driver that, for example, forms I/O command blocks sent to the system 102 and also receives responses from the system 102 in accordance with the particular protocols supported in an embodiment.

In at least one embodiment in accordance with techniques herein, the I/O driver 216a may perform processing as described herein for I/Os (e.g., read and/or write operations) directed to the L1 logical device 124. Each of the I/Os may be directed to a target location of logical device L1 124. For example, an I/O operation may be a write operation sent 201 from the host 210 to the data storage system 102. The data storage system 102 may write the data of write operation to cache 102a of the local data storage system 102. Consistent with other discussion herein, the cached write data may be later destaged to physical non-volatile storage provisioned for the L1 logical device 124.

Although in the example 200 of FIG. 4 the I/O operation 214 is a write operation, more generally, the data flow of the I/O path described is applicable for any I/O operation including a read operation with the difference that data is read rather than written with respect to the target location of the logical device.

Figure 5:
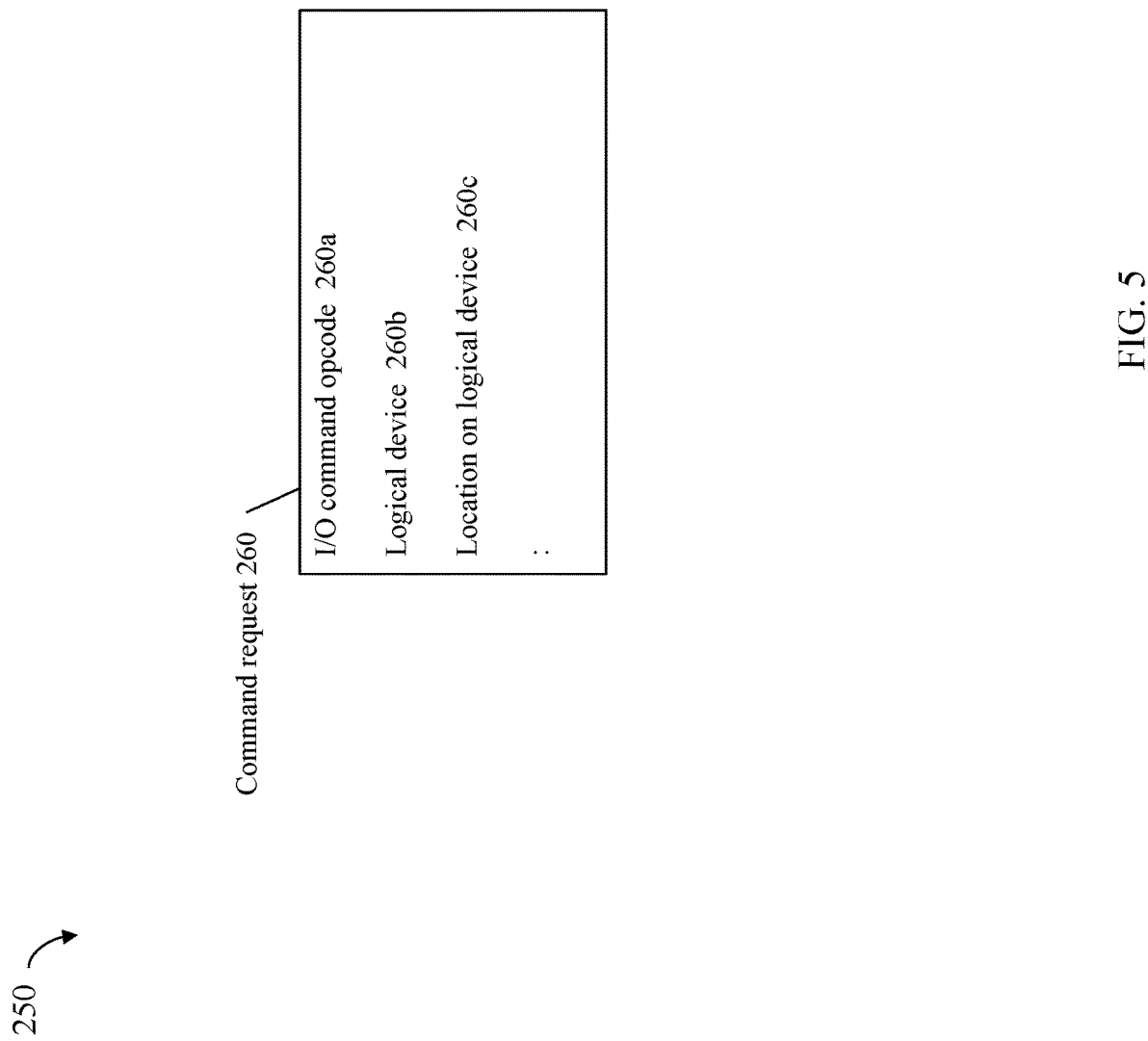
FIG. 5 is an example of a command request that may be used in an embodiment in accordance with techniques herein.

Referring to FIG. 5, shown is an example 250 illustrating information that may be included in a command request in an embodiment in accordance with techniques herein. The command request 260 may be a request to perform an I/O operation such as may be sent 201 from the host 210 of FIG. 4 to the data storage system 102. The command request 260 may include information such as the I/O command opcode 260a indicating the I/O operation is a read or write operation, the particular logical address (e.g., the logical device 260b and location or logical offset(s) 260c on the logical device) to which the I/O is directed, and the like. The different pieces of information in 260 may be included in various fields of the command request as may vary with the particular layout of the structure for 260 used in an embodiment.

Figure 6:
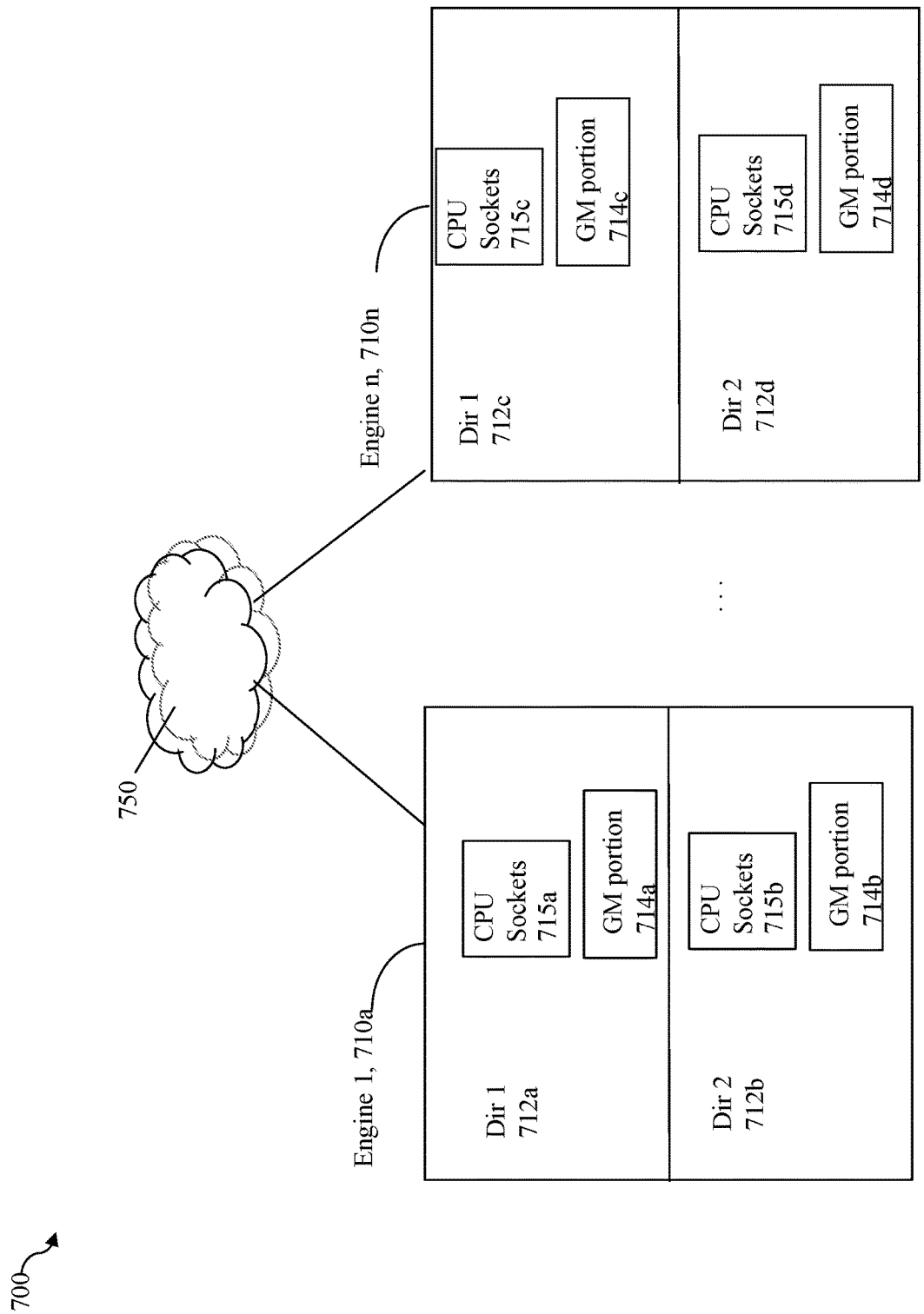
FIG. 6 is an example of directors that may be included in a data storage system in an embodiment in accordance with techniques herein.

Referring to FIG. 6, shown is an example of multiple engines as may be included in an embodiment of a data storage system in accordance with techniques herein. In this example 700, the data storage system may include a plurality of engines 710a-710n. Each of the engines 710a-710n may include components thereon as illustrated. In particular, each of the engines may include two directors. Each of the directors may also include two CPU sockets each including a number of "cores" per CPU, and a portion of global memory so that the global memory of the data storage system is collectively all such portions of global memory distributed across the directors of the multiple engines. For example, engine 710a may include two directors 712a-b.

Each director of each of the engines 710a-n may have one or more front end interface connections that support connections to the hosts. Each director may also have one or more back end connections to physical backend storage devices (non-volatile storage devices) to access physical storage devices. In this manner, each director with a front end interface connection may perform processing and function as an HA or FA as described herein. Each director with a connection to backend storage devices (non-volatile storage devices) to access physical storage devices may perform processing and function as a DA as described herein. Additionally, a director may also perform processing and function as an RA as described herein, for example, in connection with remote replication. Thus, a single physical director may perform processing as any one or more of a DA, FA, and/or RA For example, in at least one embodiment, each of the two directors 712a-b may be configured to operate as a DA and/or FA as may be desired in a particular configuration such as, for example, to vary the number of DAs and/or FAs in a particular data storage system configuration. For example, in at least one embodiment, each of the directors of each of the engines may be configured to operate as both an FA and a DA so that each single director may both receive front end I/O requests from the host (e.g., FA) and also read data from/write data to physical storage devices (e.g., DA).

Each of the directors 712a, 712b of engine 710a, respectively, may also include a portion of global memory (GM) 714a, 714b and CPU sockets 715a, 715b. Each of the engines 710a-n may also include components similar to that as illustrated and described with respect to engine 710a. Directors across the engines 710a-710n may communicate over a fabric 750. The fabric 750 may include, for example, a switch and connections between the switch and engines 710a-710n. In at least one embodiment, the fabric 750 may be an IB fabric.

The GM portion of each director may be characterized as local with respect to that particular director. For example, director 712a include GM portion 714a which is memory that is local to that particular director. Data stored in GM portion 714a may be directly accessed by a CPU or core of the director 714a. For example, GM portion 714a may be memory (e. g., DIMM (dual inline memory module) DRAM (dynamic random access memory)) that is locally accessible by director 714a where data from one location in 714a may be copied to another location in 714a directly using DMA operations (e.g., local memory copy operations) issued by a processor 715a of director 712a. Thus, the director 712a may directly access data of 714a locally without communicating over the fabric 750 to access global memory. As an alternative, the director 712a may also use the fabric 750 to access data of 714a.

GM portion 714a may include information (as described in more detail below) that is accessed (e.g., for read and/or write) generally by any director of any of the engines 710*a-n*. Thus, for example, a director of any of the engines 710*a*-710*n* may communicate over the fabric 750 to access data in GM portion 714*a*. In a similar manner, any director of any of the engines 710*a-n* may generally communicate over fabric 750 to access any GM portion comprising the global memory. Although a particular GM portion, such as 714*a* may be locally accessible to one of the directors, such as director 712*a*, any other director of any engine 710*a-n* may generally access the GM portion 714*a*. Additionally, the director 712*a* may also use the fabric 750 for data transfers to and/or from GM portion 714*a* even though 714*a* is locally accessible to director 712*a* (without having to use the fabric 750).

In at least one embodiment, there may be a maximum of 8 engines and thus 16 directors in a data storage system. The IB fabric may be used generally in embodiments with 1 or more engines (e.g., two or more directors) to facilitate communication and data transfers between directors.

In at least one embodiment of techniques herein using a host based on the IBM® System z® Architecture and running the z/OS® operating system, there may be a maximum number of 8 physical paths or connections between the host and the data storage system over which a logical device may be accessible to the host (e.g., paths over which the host may issue I/Os to the logical device). Multi-pathing is a term used to refer to the fact that a single logical device may be accessible over multiple paths where multi-pathing is limited by the z/Architecture channel subsystem implementations to 8 channel paths maximum per logical control unit, as noted above.

Discovery processing may be performed with respect to the physical paths over which a logical device on a data storage system is accessible to the host to determine which of the physical paths are online (e.g., active, available, enabled and capable of data transmissions and communication) for use in connection with host-data storage system communications. A logical path mask (LPM) may be determined by the host as a result of the discovery processing. The LPM may identify those physical paths determined by the host as online and over which the logical device is accessible to the host. Thus, the LPM may denote the paths, or that portion of the physical paths, available to the host for sending I/Os to the logical device on the data storage system. Additionally, as part of the discovery processing, the host may determine the particular data storage system director on each of the physical paths or connections. In at least one embodiment, each data storage system director may be uniquely identified using a name, number or other type of identifier that may be vary with embodiment. Various system structures may be used to identify the physical paths and also the LPM over which a logical device is accessible to the host.

In an embodiment in accordance with techniques herein with 4 engines and thus 8 directors configured with front end interfaces that receive I/O operations and requests from an external host (e.g., function as HAs or FAs), each of the 8 channels or paths from the host may connected to a different one of the 8 directors. More generally, for purposes of recoverability, the 8 physical connections or paths (denoting the maximum number of physical channels or paths from the host to the data storage system over which the logical device is accessible) may be distributed among the different directors and engines of the data storage system where each such director receives I/O requests from the host. In embodiments where there are more directors (e.g., 16 directors) than physical paths or connections (e.g., 8) from the host, an embodiment may have each physical path or connection from the host go to a different director although there will not be a physical connection directly to each director/all directors. In embodiments where there are fewer directors than physical paths or connections from the host, an embodiment may have one or more of the directors connected to the host over multiple physical paths or connections. For example, in at least one embodiment, there may be 2 engines and thus 4 directors in the data storage system and there may be 8 physical paths or connections from the host. In such an embodiment, each of the 4 directors of the data storage system may be connected to the host over 2 different physical paths or connections.

An embodiment in accordance with techniques herein may have any suitable maximum number of physical paths or connections between the host and data storage system over which a logical device may be accessed and techniques herein are not limited to use with embodiments have a maximum of 8 such physical connections or paths. An embodiment in accordance with techniques herein may also have any suitable number of directors and/or engines and is not limited to 16 directors as described herein. Additionally, and more generally, the particular limits, maximum values, and other details are provided herein for purposes of illustration and techniques herein may be readily applied for use in systems with other limits, maximum values, configurations, and the like, than as described in examples herein.

In an embodiment in accordance with techniques herein, processing may be performed to select, per I/O, a particular path over which to send the I/O to the logical device. Thus, techniques herein may select one of the available paths indicated by the LPM over which to send each single I/O to the logical device. In such an embodiment, an I/O driver, such as I/O driver 216*a* of FIG. 4, may perform such processing to select the particular path per I/O over which the I/O is issued. As described in following paragraphs, such techniques may provide for selecting the path to a particular director of the data storage system communicating with the host, where the selected director (e.g., functioning as an FA) has responsibility for cache slot allocation and locally accessing the cache slot predicted to include the data of the I/O operation (e.g. data stored at the target location to which the I/O operation is directed where the target location may denote a logical device and location (e.g., track) on the logical device).

In such an embodiment, the global memory of the data storage system used as the data cache may be distributed whereby different portions of the distributed global memory, and thus different portions of the data cache, are locally accessible to different directors (e.g., such as described in connection with FIG. 6 and elsewhere herein). Using techniques herein, the I/O driver of the host may send the I/O over a path to a particular director where the particular director selected may have responsibility for cache slot allocation for the particular I/O sent. In such a case, the director selected may also locally access a first portion of the global memory used as the data cache where the first portion (e.g., cache slot of the data cache) is used for storing cached data of the I/O operation received by the director. In at least one embodiment in accordance with techniques herein, an algorithm (also referred to herein as a cache slot allocation algorithm) may be used on the data storage system for determining the particular director responsible for cache slot allocation and caching of data for the I/O operation. The director may cache the I/O operation data in a cache slot of a distributed global memory portion that is local with respect to the director. The algorithm may, for example, take as an input the target address of the I/O operation where the target address denotes the logical device and location on the logical device to which the I/O operation is directed. The algorithm may map the target address of the I/O operation to the particular director responsible for cache slot allocation for I/Os directed to the particular target address. Processing may be performed on the host, such as by an I/O driver of the host, that also has knowledge of the algorithm used on the data storage system for cache slot allocation whereby the host may use the algorithm in connection with determining the particular director expected or predicted to handle cache slot allocation for a particular target address to which the I/O operation is directed. The I/O driver of the host may then specifically send the I/O operation to the particular director over a selected path from the host to the particular director. In this manner, the director receiving the I/O operation may also perform the cache slot allocation and storing of I/O operation data for the received I/O operation. The receiving director may allocate a cache slot location of the distributed global memory for storing the I/O operation data where the cache slot location is included in a portion of the global memory that is local with respect to the receiving director. In this manner, for example, write data directed to a write target address may be received by the director responsible for (and locally accessing) the write target address's predicted cache slot. The write data may be copied by the director into the cache slot as a local copy operation. In contrast, consider the case where a first director receiving the write data from the host is not responsible for the cache slot allocation for the target write address or, more generally, where the cache slot for the target write address is not in a first portion of global memory that is locally accessible to the first director receiving the write data. In this case, the first director may issue a request over the fabric to store the write data in its cache slot location where the cache slot location is included in another second portion of global memory locally accessible to a second different director.

Figure 7:
FIG. 7 is an example of a memory map of a director in an embodiment in accordance with techniques herein.

Referring to FIG. 7, shown is an example of information that may be included in a memory map of each director in an embodiment in accordance with techniques herein. The example 300 illustrates a director memory map that may generally including 3 segments or types of information mapped to the director's local physical memory, where at least a portion of the director's local physical memory may form a global memory portion (e.g., 714a) locally accessible to the director (e.g., 712a). The memory map 300 may include a first segment 302 of operating system (OS) structures and information, a second segment 304 that include metadata (MD) structures and a third segment 306 of user data stored in cache slots. Collectively, the second MD segments 304 and the third segments 306 of each director's local memory used to cache user data may form the global memory portions (e.g., 714a-d) of the global memory used as the cache accessible to all directors.

In at least one embodiment, the second segment 304 of the MD structures may include structures that describe the format and structure of the logical devices storing user data. The MD structures of 304 may include, for example, the logical device header and track id (identifier) tables for one or more logical devices. The MD structures of 304 may include the logical device metadata as described elsewhere herein. The third segment 306 may include multiple cache slots each including cached user data and information about the user data cached in the particular cache slot. For example, for each cache slot, information of 306 may include flags denoting state information for the cached data (e.g., whether the cached data is write pending), a logical address on a logical device of the cached data, and the like.

Referring to FIG. 8, shown is an example 500 illustrating a logical representation of data that may be stored in the data storage system cache formed from the different portions of global memory of the different directors in an embodiment in accordance with techniques herein. The example 500 illustrates portions of the distributed cache, and thus distributed global memory, in an embodiment including 16 directors. Column 502 denotes the particular director number or identifier, column 504 denotes the segments of MD structures of the 16 directors, and column 506 denotes the segments of user data cache slots of the 16 directors. Elements 510a-510m, respectively, denote the second segments 304 of MD structures stored collectively in the 16 directors (as identified in column 502). Elements 512a-m, respectively, denote the third segments 306 of the user data cache slots stored collectively in the 16 directors. In this manner, columns 504, 506 respectively denote a logical representation of the aggregated different segments 304, 306 stored in the cache of the data storage system. Each of 510a-m denotes a portion of the MD structures stored in one of the director's local memory where at least some of the director local memory is used as a global memory portion. For example, element 510a may denote the MD structures segment 304 of director 1 712a stored in GM portion 714a where GM portion 714a is local memory of the director 1 712a; element 510b may denote the MD structures segment 304 of director 2 712b stored in GM portion 714b where GM portion 714b is local memory of the director 2 712b; and so on with respect to each row of table 500 for a different one of the 16 directors.

In at least one embodiment, MD information for all the logical devices may be stored on (e.g., distributed among) the different GM portions of the different directors. Thus, the collective or aggregated MD structures segments 304 of all directors may comprise the logical device MD for all logical devices. For example, first MD for a first logical device may be stored in 510a of director 1, and second MD for a second different logical device may be stored in 510b of director 2.

With reference to columns 504 and 506, the cache slot allocation algorithm used in the data storage system may map a target location of an I/O operation, such as a read or write operation, to a cache slot or cache location. The target location may identify, for example, a logical device and logical address on the logical device to which the I/O operation is directed. The algorithm may map the target location to a particular cache slot or location in cache corresponding to a particular location in the logical cache representation of columns 504 and 506. The particular cache slot or location in cache may then further be mapped to a particular global memory portion including the cache slot where the global memory portion is locally accessible by a single one of the 16 directors. For example, a write I/O operation may write data to logical device L1 at logical address A1 on L1. The algorithm may map (L1, A1) to a cache slot or cache location included in 512a whereby it may be further determined that 512a is included in GM portion 714a that is local to director 1 712a.

In connection with techniques herein, the foregoing algorithm may be used by the data storage system by each of the directors receiving I/O operations to determine the particular cache slot location used to cache the I/O operation data. If the particular cache slot determined by the algorithm is local to the director that receives the I/O operation, the receiving director may access the cache slot including the I/O operation data using local data transfer operations without requiring use of the D3 fabric 750. If the particular cache slot determined by the algorithm is not local to the director that receives the I/O operation, the receiving director may issue a request over the IB fabric 750 to perform any needed data transfers/accesses of the particular cache slot stored in a global memory portion that is local to another one of the directors. In this manner, the host may have knowledge regarding the particular cache slot allocation algorithm used by the data storage system and may also perform the logical processing of the algorithm to predict the expected cache slot and thus particular director responsible for allocation of the expected cache slot (if not already allocated for storing the I/O operation data). The particular director can locally access the I/O operation data of the expected cache slot. If a cache slot is not currently allocated for the I/O operation (such as based on the target location of the I/O operation), the particular director may allocate the cache slot for storing the I/O operation data. If a cache slot is currently allocated for the I/O operation (such as based on the target location of the I/O operation), the particular director does not need to allocate the cache slot and performs local data transfers to and/or from the cache slot (as needed for the particular read or write of the I/O operation data). In at least one embodiment, the I/O driver 216*a* of the host 210 of FIG. 4 may predict, using the cache slot allocation algorithm, the particular director as described above. The particular director predicted using the algorithm, for example, is expected to have local access to the allocated cache slot for the I/O operation data (e.g., if I/O operation data is current in cache for the target location of the I/O operation); or the predicted director is otherwise responsible for allocation of such a cache slot for the I/O operation data.

Consistent with discussion herein, an I/O operation (e.g., read or write operation) sent from the host to the data storage system may be directed to a target address identifying a logical address, logical offset or logical location of a logical device. For example, a write I/O operation may write data to a target location of a logical device. In at least one embodiment, the logical device and target location may be expressed using 3 values where one of the 3 values denotes the logical device (e.g., numerical device identifier), and the remaining 2 values identify the target location using a cylinder number and head number. Thus, in at least one embodiment, the logical device number or identifier, cylinder number and head number may denote the target address of an I/O operation. The cache slot allocation algorithm may map the target address to the particular director including a portion of global memory from which the target address's cache slot is expected to be allocated (e.g., in the case of cache misses) or is already allocated (e.g., in case of cache hits). The particular director may handle allocation and storing of cached data for the target address in a cache slot that is local to the particular director. More generally, any algorithm or function may be used to map a target address of an I/O operation expressed in any suitable form (e.g., logical device, logical address or location on the logical device) to the particular director (e.g., such as based on the logical representation of FIG. 8). The algorithm may be used to predict from what global memory portion the cache slot will be allocated and thus which director will locally access the global memory portion including the cache slot. In such an embodiment, the I/O driver on the host may have knowledge of this algorithm used on the data storage system. For example, the logic of the cache slot allocation algorithm used on the data storage system may be embodied in code executed on the host to predict the particular cache slot location, and thus global memory portion and particular director which will locally access the cache slot for a target address of an I/O operation. The I/O driver may then send the I/O operation on a path to the particular director predicted by the algorithm.

In at least one embodiment, more than one cache slot allocation algorithm may be utilized. In such an embodiment, for example, a system call may be used to set or modify the particular cache slot allocation algorithm used. The system call may be made, for example, from the host to the data storage system to thereby allow the host to instruct the data storage system regarding what cache slot allocation algorithm to use. Further, an embodiment including such a system call may allow for identifying the particular cache slot allocation algorithm to use for all logical devices, for one or more specified logical devices, for portions (e.g., extents, tracks or particular logical addresses) of a logical device, and the like. In this manner, the host may, for example, instruct the data storage system to use a first cache slot allocation algorithm for a first logical device (or portion (s) thereof), and a second cache slot allocation algorithm for a second logical device (or portion(s) thereof). In such an embodiment, the particular algorithm may be used to specify a "best effort" in connection with cache slot allocation. It may be, for example, that the algorithm determines director 1 is to handle allocation of a cache slot for caching data stored at logical address or location A1 of logical device L1. However, there may be no free cache slots in director 1's GM portion available for allocation. In such a case, an alternative or different technique may be used to select a cache slot for allocation from another GM portion that is local to another different director. In this manner, the algorithm may be characterized as determining a suggestion for a particular director to handle cache slot allocation and locally access the cache slot including data for a target address of an I/O operation.

With reference back to FIG. 7, a director receiving an I/O operation may store data of the received I/O operation in a buffer referred to herein as an information unit (IU) buffer. Physical memory (local to the director) used for the IU buffer may be mapped into the director's OS system structures segment 302. For example, a write I/O operation that writes data to a target location may be received by a first director. The write data may be stored in an IU buffer in memory local to the first director. Assume there is currently no cache slot allocated for the target address where the cache slot allocation algorithm of the data storage system determines to allocate a cache slot from the global memory portion local to the first director. In this case, the first director performs processing to store the write data from the IU buffer to the allocated cache slot included in the global memory portion that is local to the first director (e.g., allocated cache slot location is included in the memory map of the first director). The foregoing storing of the write data to the allocated cache slot may be performed as a local memory copy operation performed by a processor of the first director without using the fabric. If the allocated cache slot is not local with respect to the first director, the first directory may issue a request over the fabric to write the data a particular allocated cache slot included in another global memory portion that is local with respect to another director.

In a similar manner with reads where read data is stored in the allocated cache slot, the read data may be read from the cache slot location and returned by the first director to the host. In the case where the read data is stored in a cache slot of a global memory portion that is local with respect to the first director, the read data may be obtained by the first director locally accessing the cache slot location in its global memory portion without issuing a request using the fabric. In the case where the allocated cache slot including the read data is not local with respect to the first director that receives the read operation, the first director may issue a request to obtain the requested read data from the allocated cache slot that is local with respect to another second director. The first director may issue the request for the read data over the fabric to the second director. The second director may retrieve the requested read data from the cache slot locally accessible to the second director, and then return the requested read data over the fabric to the requesting first director. The first director may then return the requested read data to the host.

It should be generally noted that in cases for read or write operations directed to a target location where there is no cache slot currently allocated for, or containing data from, the target location, a cache slot may be appropriately allocated and any structures accordingly updated, for example, to set one or more flags of the cache slot location (e.g., such as for a write operation to denote data of the allocated cache slot is write pending), update any appropriate logical device structure(s) to denote that allocated cache slot includes the I/O operation data for a particular logical device and logical address or location of that logical device, and the like.

In at least one embodiment, consistent with discussion elsewhere herein, a director accessing a cache slot in a global memory portion that is local to the director may be performed as a local memory copy operation by a processor of the director. For example, data may be moved between IU buffers of a director to a cache slot included in a global memory portion local to the director by a processor of the director. In such a case, both the IU buffers and the cache slot are included in the memory map or virtual memory address space of the director. However, there may be one or more points in time where the processor utilization of the director may reach a maximum threshold level. In at least one embodiment, when the utilization of the one or more processors of the director exceeds the maximum threshold level of utilization, all reads and writes by the director that, respectively, read and write data from a cache slot in a global memory portion local to the director are performed by issuing requests over the D3 fabric. In other words, once the processor (e.g. CPU) utilization of the director reaches the maximum threshold level, all requests to access data (e.g., read and/or write data) in the global memory portion local to the director are issued over the IB fabric. In this case, all requests by the director to access data from any/all global memory portions of the cache (e.g., both local and non-local memory accesses with respect to cache or global memory) may be issued over the IB fabric. In at least one embodiment, the above-mentioned maximum threshold level of CPU utilization may be 65%, selected to be a value in the inclusive range of 65%-67%, or more generally selected to be a value in the inclusive range of 65-70%. The maximum threshold level of CPU utilization may be determined with respect to the collective or aggregate number of cores or processors of the director that may have been designated as available resources to perform the local memory copy operations or tasks of the director.

In at least one embodiment in which the fabric used for communication between directors is an D3 fabric, one or more requests to access data stored in the distributed global memory/cache may be performed using a list of structures. For example, consider a case where a director has one or more IU buffers stored in its local memory for request to write data to a cache slot location of global memory. A list of structures may be created that points to the IU buffers of the requesting director. The list may be sent to the IB fabric which extracts the write data from the IU buffers of the requesting director and transmits the extracted data to a particular target director depending on the identified cache slot location that maps to a global memory portion local to the target director. In at least one embodiment, processing may be performed such as by the requesting director to determine which global memory portion of which director includes a particular cache slot location and then direct the request to that particular director. In at least one embodiment, the IB fabric request may be a scheduled asynchronous request. In contrast, the local memory copy or operation performed by a director without using the IB fabric (e.g., copy data from D3 buffer to cache slot location) may be performed as a synchronous operation.

Additionally, an embodiment of the data storage system may also select to use the D3 fabric rather than have a director perform a local memory operation if the amount of data/size of the data to be transferred exceeds a threshold size. This may be based on the fact that the IB fabric is able to efficiently and quickly perform the data transfer (e.g., read or write data to a cache slot location) even though the director may be able to perform the data transfer as a local memory operation (e.g., both source and target of the data transfer are in memory local to the director). For large amounts of data, in some embodiments, the D3 fabric may be able to perform the data transfer faster than if the data transfer is performed as a local memory operation by the director.

An embodiment in accordance with techniques herein may also have the host enable or disable use of techniques herein depending on the size of the I/O operation. For example, the host may determine whether the size of the I/O operation exceeds a specified threshold size. If so, the host may disable processing of techniques herein whereby there is no prediction by the host (using the cache slot allocation algorithm) of the expected cache slot location, and thus no director expected or predicted to locally access the global memory portion including the cache slot location for the I/O operation data. In such a case where techniques herein are disabled on the host side, the I/O operation exceeding the specified threshold size may be sent generally on any selected path using any suitable technique. Responsive to determining the I/O operation exceeds a maximum size, the I/O operation may be sent over a path to any one of a plurality of directors of the data storage system selected independent of which particular director of the plurality of directors is predicted by the cache slot allocation algorithm to locally access the first cache slot. By default, techniques herein may be enabled for an I/O operation to predict the cache slot location used for storing the I/O operation data and thus predict the particular director that locally accesses the predicted cache slot location. Using such techniques herein when enabled, the host (such as an I/O driver on the host) may send the I/O operation over a path to the particular director predicted or expected to have local access to the global memory portion including the cache slot used for storing the I/O operation's data (where the cache slot is that as predicted using the cache slot allocation algorithm). In at least one embodiment, the host may enable or disable use of techniques herein based on feedback information provided by the data storage system to the host. For example, the data storage system may provide information to the host where the information may include CPU or processor utilization (for CPU or processors of the data storage system) as measure of how busy or saturated the data storage system is. Described elsewhere herein is use of CPU utilization on the data storage system to possibly disable use of the techniques herein. In a similar manner, such information may be provided by the data storage system to the host where the host (rather than the data storage system) makes the decision of whether to enable or disable use of techniques herein.

In at least one embodiment, the host may perform processing to partition a single I/O operation into multiple smaller I/O operations. An application on a host may issue an I/O operation, such as a write operation, to a target location on the logical device, where the target location denotes a logical address portion (e.g., range or target area) that spans multiple cache slots when stored in a data cache on the data storage system. Such multiple cache slots may be predicted using the cache slot allocation algorithm to be local to different directors of the data storage system. In such instances, the host I/O driver may receive the single host write operation and further partition the single host write operation into multiple write operations where each of the multiple write operations may write an amount of data no larger than the size of a single cache slot on the data storage system. Each of the multiple I/O operations may also be sent by the host I/O driver to one of the directors predicted or expected to locally access the cache slot of the particular I/O operation data (e.g. the cache slot being predicted using the cache slot allocation algorithm as described herein). Each of the multiple write operations may individually be transmitted to the data storage system over a particular path to a particular director in accordance with the cache slot allocation algorithm as executed on the host. Consistent with discussion herein, the algorithm may be executed on the host for a write operation directed to a target location on a logical device to predict the particular director which is expected or predicted to locally access the cache slot for the target location of the logical device. For example, a single host write operation may write data to a target logical address range on a first logical device where the target logical address range spans two cache slots on the data storage system. In this case, the I/O driver may determine that the single host write spans a target range (e.g., writes an amount of data) that spans two cache slots. The I/O driver may partition the single host I/O write into two smaller write operations including a first write operation that writes data to the first logical device target locations A1 through An stored in the first cache slot, and a second write operation that writes data to the first logical device target locations B1 through Bn stored in the second cache slot. The first write operation may be sent over a path to a first director which is expected or predicted to locally access the first cache slot including data for the first logical device target locations A1 through An. In a similar manner, the second write operation may be sent over a path to a second director which is expected or predicted to locally access the second cache slot including data for the first logical device target locations B1 through Bn. The I/O driver may perform the foregoing partitioning in a manner transparent to the issuing application and issue the multiple smaller write operations to the data storage system 102 rather than a single write operation. In such an embodiment, the I/O driver may perform additional processing to track the status of each of the smaller I/O operations since each such write operation may be completed and performed in any order. More generally, the I/O driver may partition a single originating host write operation into any suitable number of smaller write operations (e.g., writing to a different logical address range) whereby collectively the smaller write operations specify a collective or aggregate set of target logical addresses equivalent to that of the single originating host write operation. It should be noted that the foregoing example mentions partitioning a single host write operation into multiple write operations. However, more generally, the foregoing applies for use in connection with host read operations as well.

Figure 9:
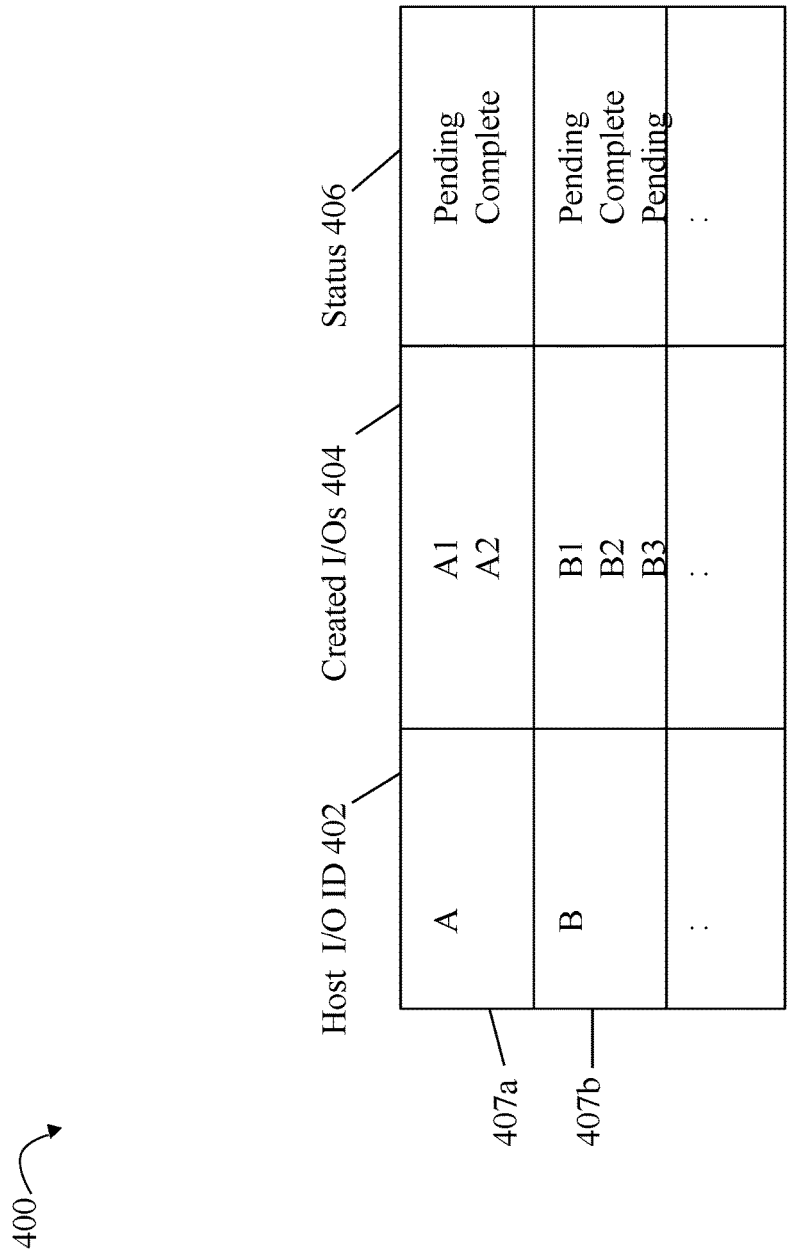
FIG. 9 is an example of information that may be used by an I/O driver of the host in an embodiment in accordance with techniques herein.

Referring to FIG. 9, shown is an example of information that may be used by an I/O driver of the host in an embodiment in accordance with techniques herein. The example 400 illustrates information that may be maintained and used by the I/O driver in connection with tracking the multiple I/O operations created as a result of a single originating host I/O operation such as issued by an application executing on the host. In at least one embodiment, each originating host I/O that is further partitioned into multiple smaller I/O operations may be assigned a unique identifier (ID) used to track and uniquely identify the originating host I/O. The table 400 may include a first column 402 denoting the originating host I/O ID, a second column 404 denoting the multiple smaller I/Os created from the single host write I/O, and a third column 406 denoting the status of each of the smaller I/Os. The table may include a set of information or entry for each of the originating I/Os. For example, row 407a includes information for the single host I/O having ID=A for which the I/O driver created two smaller I/Os—A1 and A2. In this example as denoted by 407a in column 406, write A1 is still pending while I/O A2 has completed. Row 407b includes information for another single host I/O having ID=B for which the I/O driver created 3 smaller I/Os—B1, B2 and B3. In this example as denoted by 407a in column 406, I/Os B1 and B2 are pending while I/O B2 has completed.

A status of pending in column 406 may denote that particular smaller I/O operation has not yet completed. For example, for a smaller write operation, a pending status in column 406 denotes that the I/O driver on the host has not yet received an acknowledgement from the data storage system that the smaller write operation has completed. A status of completed in column 406 may denote that particular smaller write operation has completed in that the I/O driver on the host has received an acknowledgement from the local or first data storage system 102 that the smaller write operation has completed. Once the I/O driver receives notice of completion of all smaller writes 404 created for a particular originating write denoted by 402, then the I/O driver may return an acknowledgement to the application or other requester that the originating write has completed. The I/O driver may also update the table 400 to remove information regarding an originating write once all created writes for the originating write have completed.

In a similar manner for a smaller read operation, a pending status in column 406 denotes that the host has not yet received the requested read data for the smaller read operation. Once the I/O driver receives notice of completion of all smaller reads 404 created for a particular originating read denoted by 402, then the I/O driver may return an acknowledgement to the application or other requester that the originating read has completed. The I/O driver may also update the table 400 to remove information regarding an originating read once all created smaller reads (denoted in column 404) for the originating read (in column 402) have completed.

Described above are embodiments in accordance with techniques herein to perform I/O path optimizations, per I/O operation, based on predicted cache slot location. As noted above, an embodiment includes a host that directs I/O down channel(s) or path(s) that are connected to the director that has the responsibility for the cache slot allocations for the I/O (e.g., extent/tracks accessed by the I/O). In such an embodiment, local data for the I/O operation stored in the IU buffer of the director may be copied into the cache slot as a local copy rather than as a fabric request.

In at least one embodiment of a data storage system configuration described above, each director has local memory (e.g., DIMM DRAM) that includes system structures, MD and user cache slots (e.g., see FIGS. 7 and 8 and descriptions herein). Each Director may also have front-end interface connections that support host connections and also back-end interface connections to physical storage devices of the back-end providing non-volatile data storage. Additionally, an embodiment of the data storage system may include multiple engines, each with two directors, where such engines/director may be connected by a fabric, such as the D3 fabric. Host channels or paths to a logical device may span directors/engines. When an I/O is sent by the host over a channel and the cache slot (e.g., resides in GM portion of DRAM on the director) that needs to be accessed or allocated for this I/O request is locally resident with respect to the receiving director, a local copy can be initiated. A local copy can be performed when the IU and the cache slot are both in the same director where such a local copy may have an advantage in terms of time and resources over the alternative of performing the copy/data transfer over the fabric to another director in a multi-engine configuration. The local copy trades the reduced latency of the memcopy (memory copy) operation (e.g., as may be performed for data transfers between the IU and cache slot in local memory of the same director) especially for small data transfers. However, performing such local copies by a director in at least one embodiment causes an increase in CPU or processor utilization of the director since the memcopy operation is a function performed by instruction on a director core. When the CPU utilization of a director reaches a maximum threshold level, the local memcopy operation may be bypassed and alternatively the fabric may be used for the data transfer, as discussed above. It is also important to note that on very large transfers that span multiple cache slots, in some embodiments it may be faster to send the data over the Fabric rather than perform the data transfer using a memcopy/local memory copy operation. In embodiments including a majority of relatively small (e.g., 2K-27K byte) data transfers, larger performance benefits may be realized using the memcopy/local memory copy operation when possible such as in accordance with techniques herein. It should be noted that the use of memcopy herein generally refers to a memory copy operation between a source and target memory location. In terms of the C programming language, for example, the memcopy may be expressed as "memcpy".

As described herein the host may generally understand or have knowledge regarding the cache slot allocation algorithm used on the data storage system and how the cache slots are allocated relative to a logical device and logical addresses or locations (e.g., the track locations) on that device. Having this information, the host may direct a specific I/O down the path to a director that has, or will allocate, the cache slots to be used for storing cached data of the I/O. An embodiment in accordance with techniques herein may use a cache slot allocation algorithm used on the host side to predict, for an I/O operation, what data storage system director either has the cache slot allocated (e.g., data for the I/O operation currently in cache for the device/track to which the I/O operation is directed) or would be responsible for the cache slot allocation.

Generally, techniques herein for the I/O path optimization of directing an I/O on a path to a particular director expected to locally access the cache slot for the I/O and handle cache slot allocation for the I/O may be performed with respect to any I/O operation directed to a target location, such as a logical address, track, location, and the like, on a logical device where the I/O operation data is or will be stored in a cache slot of the distributed global memory on the data storage system. In particular, for example, such techniques may be performed with respect to an I/O operation that reads and/or writes user data such as may be stored in a cache slot mapped to a segment 306 of a director. Such techniques herein may also be performed with respect to an I/O operation that reads and/or writes other data, such as MD for the logical devices stored in an cache slot mapped to segment 304 of a director.

Figure 10:
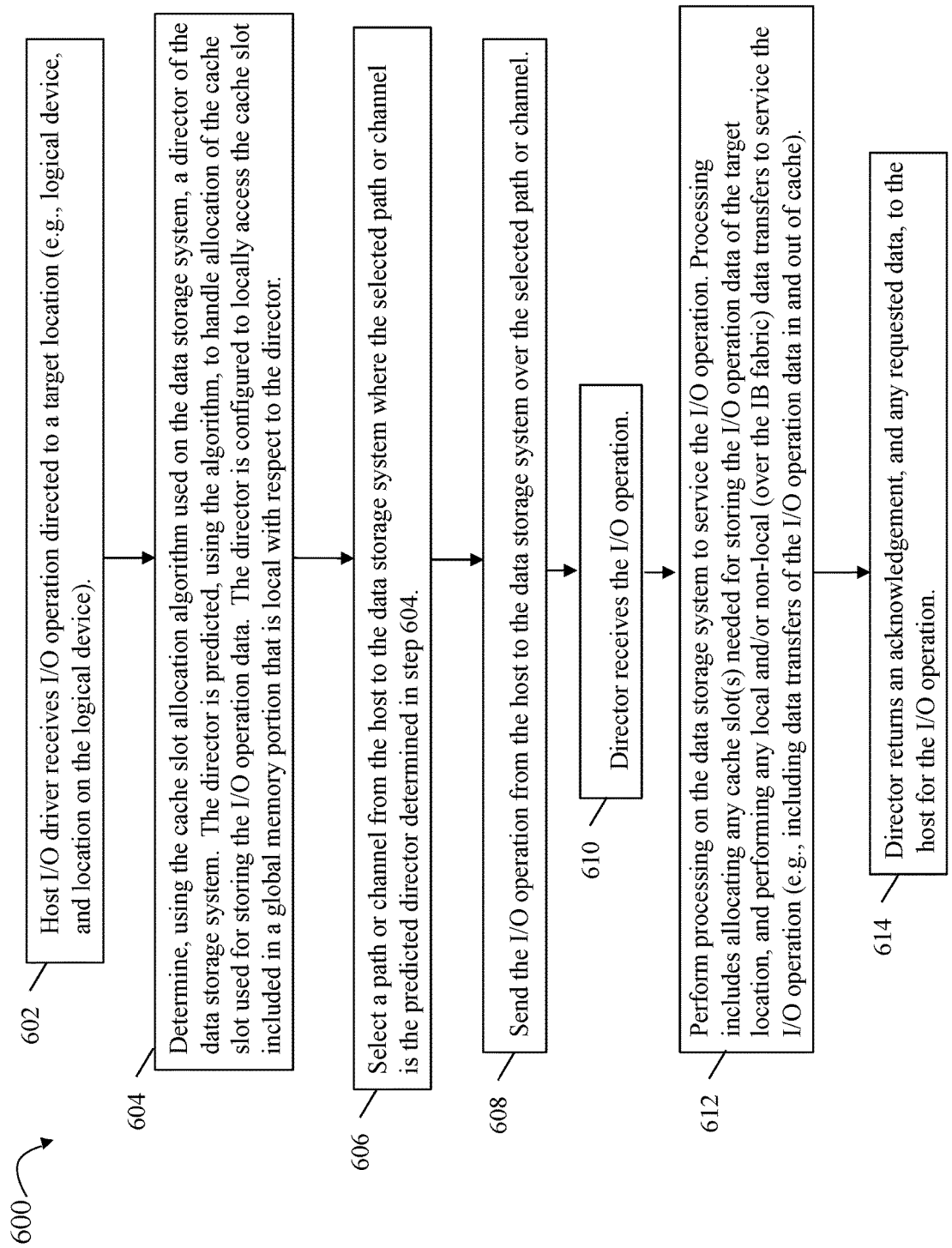
FIG. 10 is a flowchart of processing steps that may be performed in an embodiment in accordance with techniques herein.

Referring to FIG. 10, shown is a flowchart of processing steps that may be performed in an embodiment in accordance with techniques herein. The flowchart 600 generally summarizes processing described above where the host I/O driver performs the I/O path optimization for an I/O operation. At step 602, the host I/O driver receives an I/O operation directed to a target location (e.g., logical device and location on a logical device). At step 604, processing is performed to determine, using the cache slot allocation algorithm utilized on the data storage system, a director of the data storage system. The director is predicted, using the algorithm, to handle allocation of the cache slot that stores for the I/O operation data for the target location. The director is configured to locally access the cache slot included in a global memory portion that is local with respect to the director. At step 606, processing is performed, such as by the I/O driver of the host, to select a path or channel from the host to the data storage system where the selected path or channel is the predicted director determined in step 604. In step 608, processing is performed to send the I/O operation from the host to the data storage system over the selected path or channel to the predicted director. At step 610, the director receives the I/O operation. At step 612, processing is performed on the data storage system to service the I/O operation. Such processing of step 612 may include, for example, allocating any cache slot(s) needed for storing the I/O operation data of the target location, and performing any local and/or non-local (over the IB fabric) data transfers to service the I/O operation (e.g., including data transfers of the I/O operation data in and out of cache). As described herein, if the cache slot including the I/O operation data of the target location is local with respect to the receiving director (that received the I/O operation in step 510), the director may perform local data transfers to and/or from the cache slot. If the cache slot including the I/O operation data of the target location is not local with respect to the receiving director (that received the I/O operation in step 510), the director may perform non-local data transfers to and/or from the cache slot using the IB fabric. Depending on the particular CPU utilization, size of the data transfers, and the like, the director may also perform processing to forego any possible local data transfers to and/or from the cache slot and may alternatively select to perform all data transfers over the IB fabric. At step 614, once the I/O operation has been serviced, the director (that received the I/O operation in step 510) may return an acknowledgment and any requested data to the host in connection with the I/O operation serviced.

Although not explicitly noted in FIG. 10, the host I/O driver may perform other processing as described herein depending on the particular embodiment. For example, the host I/O driver may disable performing the optimization for I/O operations having an I/O size larger than a specified threshold, may partition a single write into multiple smaller writes, and the like, as described above.

In connection with discussion above, such as with reference back to FIGS. 6, 7, and 8, described is an embodiment of a data storage system including a distributed global memory (GM) with different portions of the GM that are local to different corresponding directors. In such an embodiment, all portions of the distributed GM may be generally accessible to all directors. In a system, particular one or more portions of the GM may be local with respect to a particular director with remaining non-local portions of the GM also accessible to the particular director. In a system, such as one including multiple engines, a communications fabric such as an Infiniband (TB) fabric may be used by each director to access non-local GM portions (e.g., that are local to other directors). As also discussed above, such as with reference to FIG. 7, user data and metadata (MD) of logical devices may also be stored in such distributed GM portions. Such user data of the logical device may be stored in a data cache (e.g., such as when the user data is written to the logical device). The data cache may include cache slots of the user data stored in one or more GM portions of one or more directors located on one or more engines. Additionally, the data cache may include a cache slot header for each cache slot with information about the particular user data cached in the single cache slot. Such information stored per cache slot such as in the cache slot header may include, for example, flags denoting state information about the cached data (e.g., whether cached data is write pending), may identify the particular logical device and logical device locations having its data stored in the cache slot, and the like. Such MD for a logical device stored in the distributed GM may include, for example, MD structures that describe the format and structure of the logical devices storing user data. The MD for a logical device may include, for example, a logical device header structure, a table or other structure identifying physical device locations at which the user data of the logical device is stored (e.g., map logical device locations or addresses to physical storage locations), identify whether user data stored at particular logical device locations are stored in cache, and if so, identify a cache location where the user data is stored in cache, and the like. Additionally, buffers such as IU buffers used by a director may also be allocated from the memory local to the director, although the director local memory allocated for such IU buffers may or may not be mapped into the GM logical memory space (e.g., FIG. 8) depending on the embodiment.

In connection with a data storage system having a distributed GM storing cached data and MD for logical devices, the data storage system may include multiple engines which communicate using the IB fabric to read from, and/or write data to, GM portions local to other directors. When a first director receives an I/O operation directed to a target location on a target logical device, the first director may perform processing that includes accessing MD for the target logical device from a GM portion, and reading data from/writing data to, a cache slot in a GM portion. In such a case, the first director may access the one or more GM portions (including cached user data and target logical device MD) using the D3 fabric, for example, where such GM portion(s) are stored on memory local to other directors of different engines. In such a case where the D3 fabric is used, it may take an unacceptable or undesirable amount of time for the first director to access the needed one or more GM portions when such GM portions are accessed over the IB fabric. Put another way, the amount of time that lapses when the D3 fabric is used to access a desired GM portion may be characterized as significantly greater than the amount of time incurred to access a desired GM portion that is local to a director. Thus, the response time (RT) for a first I/O operation requiring access to the GM portion using the IB fabric may be significantly higher than a second I/O operation where the receiving director only accesses GM portion(s) local to the director, or generally not using the IB fabric.

To this end, an embodiment in accordance with techniques herein may selectively identify one or more logical devices for which reduced I/O latency is desired. For example, a particular application may have extremely low latency requirements (e.g., 20-40 microseconds) in connection with the application's data stored on a logical device. For example, a database application may require that its log files be stored on a logical device meeting such very low latency requirements and thereby provide for a low average I/O RT. In following discussion, a logical device having such high performance and low latency requirements may be referred to as an LLD or low-latency logical device. It should be noted that in at least one embodiment, the one or more LLDs may be a subset of all target logical devices to which I/Os may be issued by a host. Each LLD may be selectively identified as a target logical device to which I/Os are directed, such as from an application on a host, where the application requires that I/Os directed to the LLD have a low RT, and thus, may use techniques herein to establish low latency for the LLD. In following discussion, a logical device which is not designated as an LLD may be generally referred to as a regular logical device or non-LLD which does not have such low latency requirements as a designated LLD.

Before further discussing use of techniques herein in connection with LLDs and regular or non-LLDs, what will first be described is additional detail about how a data storage system in accordance with techniques herein may operate.

Figure 11:
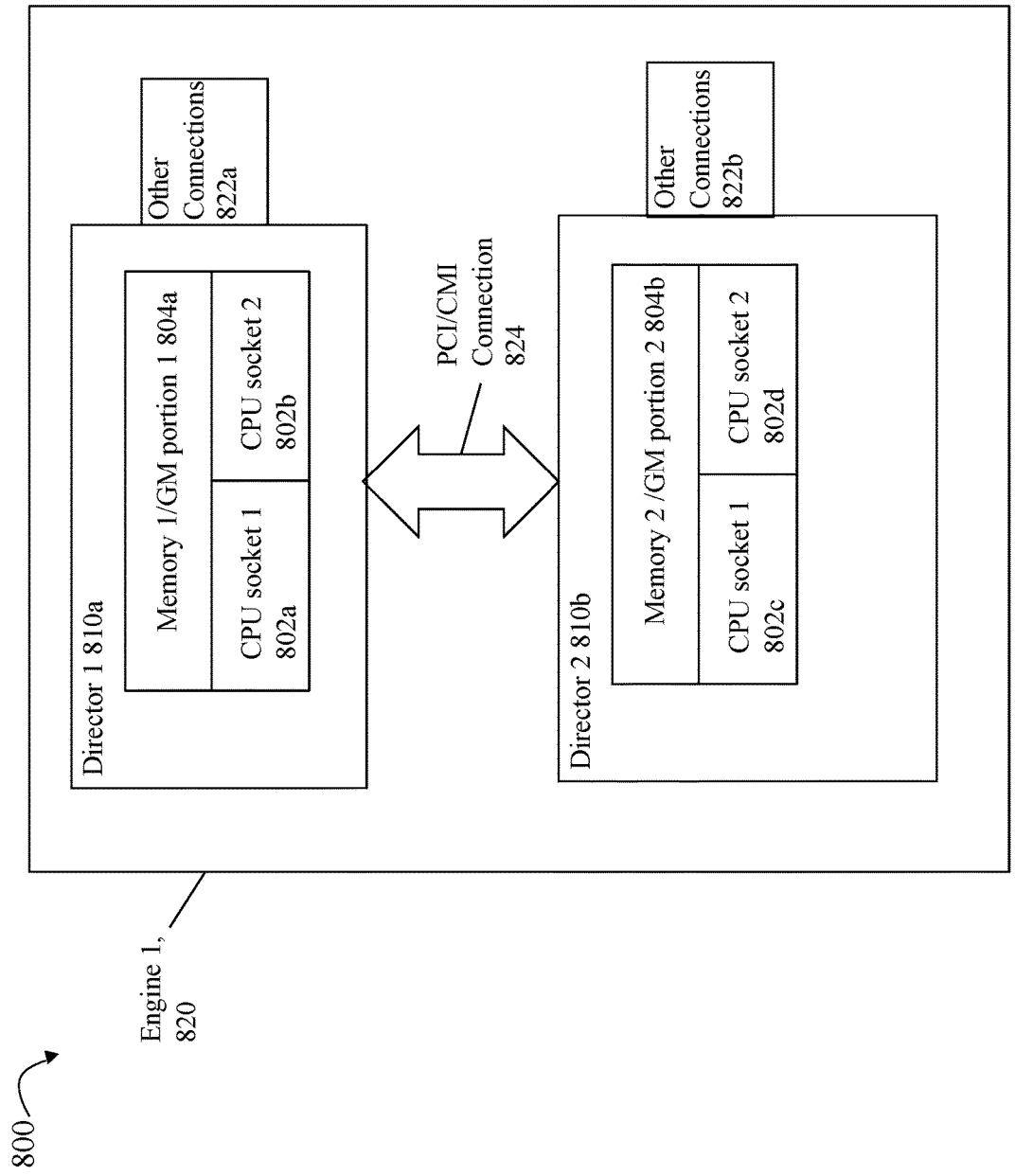
FIGS. 11, 12 and 13 illustrate components that may be included in a system in accordance with techniques herein.

Referring to FIG. 11, shown is an example 800 illustrating in more detail components that may be included in each engine in an embodiment in accordance with techniques herein. Generally, the example 800 includes components as described above, such as in connection with FIG. 6. The example 800 includes a single engine 1 820 which includes 2 directors 810*a* and 810*b*. Director 810*a* includes GM portion 804*a*, two CPU sockets 802*a-b*, and other connections 822*a*. Director 810*b* includes GM portion 804*b*, two CPU sockets 802*c-d*, and other connections 822*b*. Elements 810*a-b*, 804*a-b*, and 802*a-b* are respectively similar, for example, to elements 712*a-b*, 714*a-b*, and 714*a-b* of FIG. 6. Other connections 822*a-b* may include connections from directors 810*a-b* to other components, such as connections to the IB fabric, connections to one or more physical storage devices (e.g., non-volatile storage devices providing back-end provisioned physical storage for logical devices), connections to one or more hosts, and the like. Also included in the example 800 is a PCI (Peripheral Component Interconnect)/CMI (Communication Manager/Management Interface) connection 824 that may be used for communications between directors 810*a-b* on the same engine 820. The connection 824 may alternatively be a PCIe (Peripheral Component Interconnect Express)/CMI connection used for communications between directors 810*a-b* on the same engine 820. Thus, in one aspect the connection 824 may be characterized as an engine-local interface generally used for communications between directors of the same engine.

The example 800 illustrates components that may be included in a single engine. More generally and consistent with discussion such as in FIG. 6, an embodiment of a data storage system may also include multiple engines, such as multiple instances of 820, where directors of different engines may communicate over the IB fabric.

In at least one embodiment in accordance with techniques herein, the data storage system may be configured to have a single engine 820, or may be configured to have multiple engines (e.g., multiple instances of 820). In the multiple engine configuration, directors may communicate using the IB fabric. In the multiple engine configuration, directors on the same engine (e.g., such as directors 810*a*-*b*) may communicate using the IB fabric. Furthermore, as described in more detail below, when performing processing in connection with LLDs, communications between directors (e.g., 810*a*-*b*) of the same engine may alternatively use the PCI/CMI connection 824 for inter-director communication on the same engine rather than use the D3 fabric. However, when performing processing in connection with non-LLDs or regular logical devices, communications between directors (e.g., 810*a*-*b*) of the same engine may use the IB fabric. Use of the PCI/CMI connection 824 for inter-director communication on the same engine, such as for LLDs as described herein, may provide for faster data transfers and data accesses between directors 810*a*-*b* as compared to performing the same data transfers and accesses using the IB fabric.

In the single engine configuration, the data storage system may not include an D3 fabric for communication between directors. Rather, in a single engine system, the IB fabric may be omitted and directors on the same engine (e.g., such as directors 810*a*-*b*) may communicate using the PCI/CMI connection 824 for inter-director communication. Thus, in a single engine configuration, the PCI/CMI connection 824 may be used for all inter-director communications in connection with both LLDs and regular logical devices or non-LLDs.

In an embodiment of the data storage system in accordance with techniques herein, pending write data (denoted as WP (write pending) as described elsewhere herein) directed to a logical device may be stored in cache whereby the WP data is later destaged to non-volatile physical storage provisioned for the logical device. Such WP data stored in cache prior to destaging may be mirrored or duplicated to another cache location. Such duplication or mirroring of cached WP data may be performed due to possible failure of components, such as failure of a director and/or a director's local GM portion.

For non-LLDs in a single engine configuration, the cached WP data may be mirrored in both GM portions of the two directors of the single engine. For example, the WP data may be stored in cache locations of 804*a* and 804*b*. In at least one embodiment with the single engine configuration in which there is a PCI/CMI connection 824 but no D3 fabric, the connection 824 may be used to mirror the WP data. For example, director 810*a* may receive a write I/O directed to a non-LLD and store the WP data in a cache location in GM portion 804*a*. The director 810*a* may also perform processing to mirror the WP data by copying the WP data from GM portion 804*a* to another cache slot in GM portion 804*b*. The foregoing copying or transferring of the WP data from 804*a* to 804*b* may be performed over the PCI/CMI connection 824.

For non-LLDs in a multiple engine configuration, the cached WP data may be mirrored, using the D3 fabric, in two different GM portions of two different engines. Generally, an embodiment may use any suitable technique to select the two GM portions of two different engines for storing the WP data. For example, in at least one embodiment, the particular cache slot selected for use may be made so that cached data is striped across different engines (e.g., rotate sequentially through all engines and select a next cache slot for use from the next engine in the rotation). In such an embodiment, the striping technique may be used to select an initial cache slot to store WP data for a received write operation directed to a non-LLD or regular logical device, whereby the initial cache slot is located in a first GM portion of a first engine. A copy or duplicate of the WP data for the non-LLD may then be stored in a second cache slot of a second GM portion of a second engine. Any suitable technique may be used to select the second cache slot sored in the second GM portion of the second engine. For example, in at least one embodiment, the second engine may be selected as the next engine in the striping rotation. With reference to FIG. 6 for non-LLDs, in a multiple engine configuration, the write data (WP data) may be received by a first director 712*a* of a first engine 710*a* whereby the write data (WP data) may be stored in a first GM portion and is mirrored in another second GM portion of a second director of a second engine. For example, the write may be received by director 712*a* of engine 710*a* and the WP data may be stored in a first cache slot in GM portion 714*a* local to director 712*a*. The WP data may also be mirrored in another GM portion of a different engine, such as GM portion 714*c* of engine 710*n*, by transferring the data from GM portion 714*a* over the D3 fabric 750 to GM portion 714*c*. Thus, in connection with a system having M directors (M being an integer greater than 1), a director may receive an I/O directed to a non-LLD or regular logical device where there is a 1/M chance that the cache slot allocated for storing the I/O data is stored locally in a GM portion of the receiving director.

Figure 12:
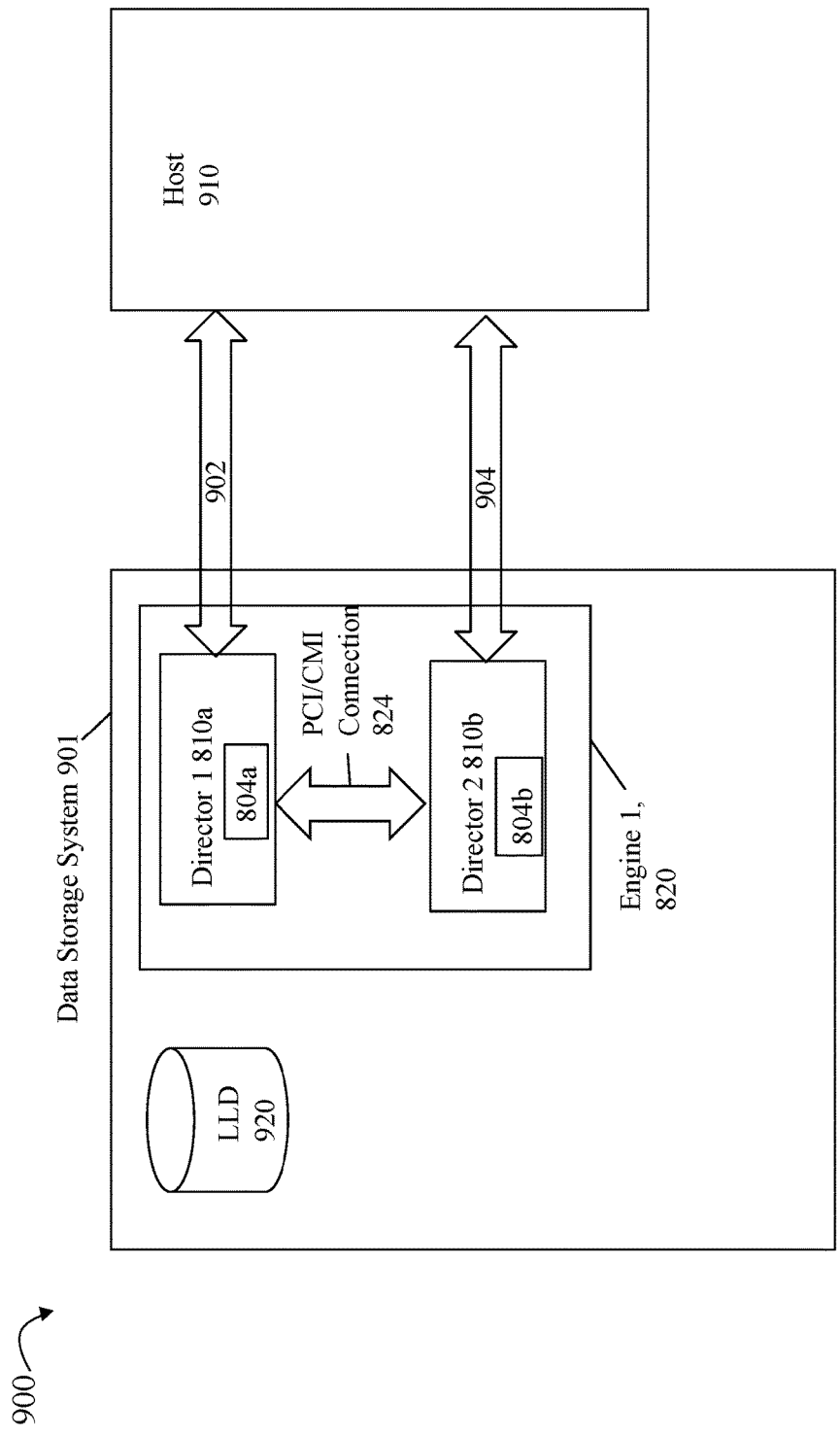

In connection with techniques herein in both single engine and multiple engine systems, a single director may be designated as the primary director for each LLD. In one aspect, the primary director for a LLD may be characterized as the owning director of the LLD in the distributed GM system. As described below in more detail, the owning or primary director may be the sole director that performs I/O operations for the designated LLD. For example, reference is now made to FIG. 12 illustrating use of techniques herein for an LLD with a single engine system.

The example 900 includes components similar to that as illustrated and described in FIG. 11 with some elements omitted for simplicity and additional elements added to illustrate techniques herein. The example 900 includes data storage system 901 which may be a single engine configuration including engine 802 with directors 810*a*-*b*, distributed GM portions 804*a*-*b*, and PCI/CMI connection 824. Element 920 may denote an LLD whereby director 1 810*a* may be designated as the primary director for the LLD 920. Element 920 may identify the LLD as well as the physical non-volatile storage provisioned for the LLD. In at least one embodiment, any physical storage allocated or provisioned for the LLD may be located on one or more physical storage devices directly accessible or attached to the primary director 810*a*. In other words, the primary director 810*a* may directly access physical storage devices provisioned for LLD 920 and does not need to issue requests to any other director to read data for LLD 902 from allocated physical storage, or write data to LLD 902 to allocated physical storage. Thus, for example, if LLD 902 has its storage allocated from a RAID group, all physical storage devices of the configured RAID group may be directly attached or accessible to the primary director 810*a* of LLD 920. It should be noted that such physical storage devices providing back-end non-volatile physical storage for LLD 920 may also be directly accessible or attached to one or more other directors of the data storage system 901.

Element 902 may represent the one or more channels or paths between host 910 and director 810a, and element 904 may represent the one or more channels or paths between host 910 and director 810b. Generally, the host 910 may have connections or paths to multiple different directors of the data storage system 901 in case of failure of particular paths and/or directors.

In connection with techniques herein, only director 810a, the owner or primary director, may be allowed to receive I/O operations for the LLD 920 and may be allowed to perform processing for I/Os directed to the LLD 920. In connection with enforcing such restriction or designation of the primary director 810a as sole owner of the LLD 920, a host 910 issuing the I/O operations directed to the LLD may ensure that all I/Os to the LLD 920 are only issued to the primary director 810a. In particular, the host 910 may ensure that all I/Os to LLD 920 are only sent over only channels or paths 902 to the primary director 810a. For example, the host 910 may ensure that no I/O directed to LDD 920 is sent over any path of 904 to director 810b. As described elsewhere herein, such paths 904 may be used as backup or secondary paths to access data of LLD 920 in the event of failure or unavailability of director 810a and/or paths 902. Otherwise, so long as director 810a is available for receiving and processing I/Os to LLD 920 where the I/Os are sent over paths 902, the host 910 does not send I/Os to LLD 920 over any path of 904 (no I/Os to LLD 920 are sent to director 810b or generally any other director other than primary 810a).

In an embodiment in accordance with techniques herein, the primary director 810a that owns LDD 920 may allocate any needed GM from GM portion 804a that is local to the primary director 810a. Generally, the director 810a may perform all operations locally with respect to the LLD 920 such that memory needed for IU buffers, cache slots, LLD 920's logical device MD, and the like (e.g., in connection with servicing I/Os directed to LLD 920), may be allocated from GM portion 804a that is local to the primary director 810a. For example, all cache locations used for caching data of PPD 920 may be allocated from GM portion 804a locally accessible to director 810a. All GM allocations made for storing logical device MD (e.g., MD structures 304) for LLD 920 may be allocated from GM portion 804a.

When a write operation directed to LLD 902 is received by the primary director 810a, the write data is stored in a cache location in GM portion 804a. Such write data is now WP since it has not yet been destaged to physical storage provided for LDD 920. As such, while the WP data is in cache allocated from GM portion 804a waiting to be destaged, the WP data may be mirrored to another cache location in GM portion 804b. In a single engine system, the write data may be mirrored to the second GM portion 804b local to the second director 810b of the single engine 820. The foregoing mirroring may be performed by sending the write data from the primary director 810a to the director 810b over the PCI/CMI connection 824.

Figure 13:
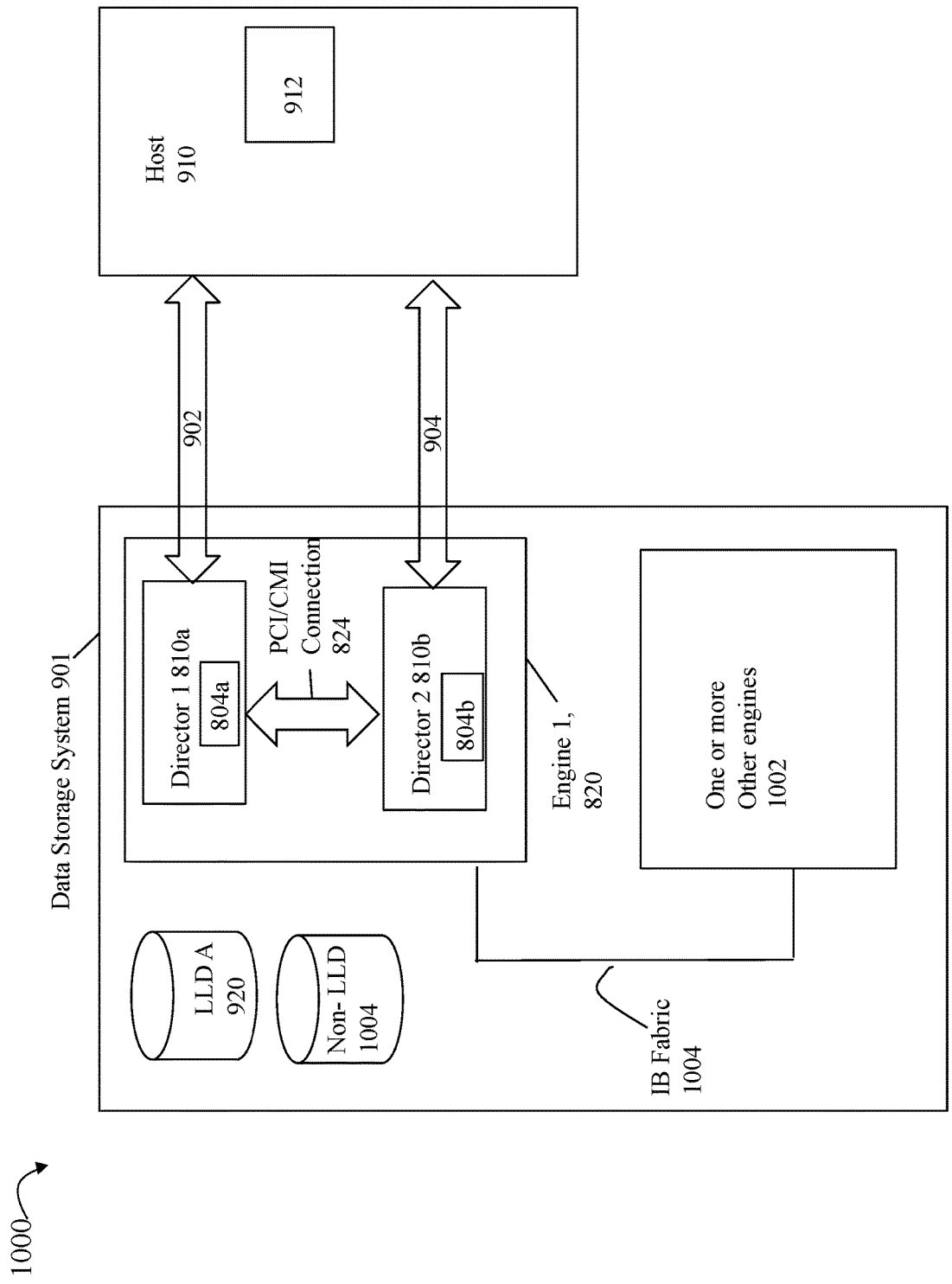

Referring to FIG. 13, shown is another example illustrating use of techniques herein with an LLD in a data storage system with a multiple engine configuration. The example 1000 includes components similar to that as illustrated and described in FIG. 12. Additionally, the example 1000 includes one or more other engines 1002 and IB fabric 1004. Each of the engines 1002 may include multiple directors such as described in connection with other engines herein (e.g., similar to engine 802 of FIG. 11). The D3 fabric 1004 may be connected to each director on each of the engines 820 and each director on each engine denoted by 1002. As described herein, for mirroring WP data of non-LLDs (such as non-LLD 1004) among different GM data portions of different directors, the D3 fabric 1004 may be used for inter-director communications between directors of different engines as well as between directors of the same engine.

In a multiple engine configuration for LLD 920 having primary director 810a, WP data of LLD 920 stored in GM portion 804a may be mirrored to the GM portion 804b of the companion or adjacent director 810b on the same engine 802 as the primary director 810a. The PCI/CMI connection 824 may be used to perform the mirroring or copying of the cached WP data of LLD 920 from 804a to 804b. The foregoing mirroring of the cached WP data for LLD 920 over connection 824 to a second GM portion 804b of an adjacent or companion director 810b on the same engine 802 as the primary director 810a may be performed in both a single engine and multiple engine data storage configuration.

In one aspect in a multi-engine system, the IB fabric 1004 may be characterized as an inter-engine fabric or interface as well as an inter-director interface used to facilitate communications between directors (of the same engine as well as different engines). In accordance with techniques herein, for LLDs each having a primary director of a particular engine, the PCI/CMI connection of the particular engine may be used rather than the D3 fabric 1004 for mirroring cached WP data of the LLDs to another cache location in a GM portion of another director also included in the same particular engine as the primary director. In such an embodiment performing specialized processing as described herein for LLDs, the IB fabric is also used where needed for communications between different directors of different engines, such as in connection with generally accessing other GM portions of other directors. However, such specialized processing may be performed for LLDs in both single and multiple engine configurations in accordance with techniques herein in order to minimize or reduce latency in connection with LLDs.

In contrast to LLD 920, non-LLD 1004 may not have such specialized processing performed as described herein. For non-LLD 1004, there is no designated primary director. I/Os to the non-LLD 1004 may be sent to any director of the data storage system 901 (e.g., any configured director of 901 over which non-LLD 1004 is accessible for I/Os). Additionally, mirroring (in different GM portions) of WP cached data of non-LLD 1004 in a multiple engine system uses the D3 fabric 1004 to perform such mirroring or copying between GM portions. In a multiple engine configuration, the two copies of the WP cache data of the non-LLD 1004 may be stored or mirrored in two different GM portions of different engines.

As described above, the data storage system may perform engine-local mirroring of cached WP data for LLD 920 whereby the cached WP data is mirrored to the adjacent director 810b on the same engine 802 as the primary director 810a. Further, such mirroring of cached WP data for LLD 920 may include transmitting the cached WP data from 804a to 810ab/804b over the engine-local connection or interface 824. Only the designated primary director 810a of the LLD 920 may be allowed to receive and process I/Os for the LLD 920. The host may control issuance of such I/Os to only the designated primary director 810a. As such, in cases of normal or typical operation with servicing I/Os for an LLD 920, generally any chunk of GM portion 804a allocated or used in connection with LLD 920 will not be shared or accessed such as by multiple directors. Rather, allocated portions of GM for LLD 920 are only used by the single primary director 810a. In this manner, chunks of GM portion 804a allocated for use in connection with LLD 920 may be configured for non-shared non-concurrent access (e.g., assume single director use by only the primary director). In such a case, chunks of GM portion 804a allocated for use in connection with LLD 920 do not require overhead incurred with use of additional controls providing for serialization or exclusive access as may be needed in cases where such allocated chunks may be shared or accessed by multiple directors (e.g., for LLD, control to ensure no two directors write to the same allocated chunk, control to ensure exclusive access of a chunk by a director writing to the chunk, and the like are not needed). In this manner, GM allocations in connection with LLD 920 may be configured for single/sole/non-shared use by primary director 810a whereby such locking, synchronization, and the like, (typically performed in connection with controlling access to allocated GM chunks that may be shared) may now be disabled. The foregoing disabling of processing and controls typically performed for shared use of allocated GM (e.g., configuring GM allocations made for use in connection with LLD 920 for non-shared or single-user) provides for further reduction in latency for LLD 920. In this manner, the data storage system may be configured to disable synchronization and serialization performed in connection with GM allocations for LLD 920. Such allocations may include, for example, allocations of GM portion 804a for storing cached data of LLD 920, allocations of GM portion 804a used to store logical device MD for LLD 920, and allocations of GM portion 804a allocated for local use by the primary director 810a (e.g. such as for physical memory (local to the director 810a) used for an IU buffer mapped into the director's OS system structures segment 302).

Only in cases where the primary director 810a is unavailable or inaccessible for servicing I/Os from the host 910 (e.g., if primary director 810a fails, has its connections 902 fail, and the like) would one or more other directors be allowed to receive and/or process I/Os for the LLD 920. For example, in at least one embodiment, upon failure or unavailability of the primary director 810a, the adjacent director 810b on the same engine 820 as the primary director 810a may be allowed to receive and service I/Os directed to LLD 920. Upon failure or unavailability of the primary director 810a, the system may be characterized as being in a degraded state.

Upon failure or unavailability of the primary director 810a, an embodiment may use an alternative technique in order to mirror the cached WP data for LLD 920. In this example at a the point of failure of 810a, the cached WP data for LLD 920 may be stored in 804a and 804b. As a first option or alternative when in the degraded state with primary director 810a unavailable, in at least one embodiment the LLD 920 may be reconfigured as a non-LLD or regular logical device. In connection with such reconfiguration while in the degraded state, I/Os, GM memory allocations, cached WP mirroring, and the like, may be performed for the reconfigured logical device 920 as described herein in connection with a regular logical device. For example, allocations made from GM portions for use with the reconfigured logical device 920 may be enabled for shared or concurrent access by multiple directors, cached WP data mirroring performed using the IB fabric (where the cached WP data is mirrored in GM portions of different engines), and the like, as described herein for a non-LLD or regular logical device. In this manner with the LLD reconfigured as a regular logical device, such allocations from GM have synchronization and access controls enabled whereby such allocated GM chunks are configured for shared access among multiple directors. Thus, such allocated GM chunks require synchronization and serialization controls for different types of access, such as providing a single director exclusive access to an allocated GM chunk when the director is writing to the chunk, in order to preserve integrity of data in the allocated GM chunks (e.g., enabled controls providing required serialization and synchronization to allocated GM chunks under the assumption that such GM chunks are accessible and used by multiple directors).

It should be noted that if the primary director 810a of LLD 920 fails or is otherwise unavailable, another director 810b on the same engine as the failed director 810a may perform recovery processing to restore the system from a degraded to a non-degraded state. Upon failure, GM portion 804b may include the sole or single copy of WP data for LLD 920. Such recovery processing in a multiple engine configuration may include, for example, director 810b mirroring the cached WP data in 804b for LLD 920 in another GM portion of another director on another engine (e.g., one of the engines of 1002). Also while in the degraded state with primary director 810a unavailable, the host 910 may detect such unavailability or failure of 810a due to failure of I/Os that are directed to LLD 920 where such I/Os are sent over connections or paths 902. Responsive to the host 910 detecting failure of I/Os to LLD 920 on paths 902, the host 910 may reissue the failed I/Os as well as subsequent I/Os to LLD 920 over other paths 904 to the adjacent director 810b. In this manner, the host 910 is still able to access data of LLD 920 (now reconfigured as a non-LLD or regular logical device) by issuing its I/Os over paths 904. It should be noted that the data storage system may be configured so that director 810b has access to physical storage devices provisioned for LLD 920.

As a second option or alternative when in the degraded state with primary director 810a unavailable, rather than have the data storage system mirror cached WP data for LLD 920, a host-based mirroring technique may be used as described below. Additionally, it should be noted that host-based mirroring techniques may be used generally rather than have the data storage system perform processing to mirror cached WP data for an LLD, such as LLD 920.

In at least one embodiment in which host-based mirroring is performed for LLD 920, WP data may be cached in GM portion 804a of the primary director 810a. However, the data storage system 901 does not perform processing to mirror or copy the cached WP data of LLD 920 from 804a to another GM portion of another director. Rather, the host controls and performs processing to mirror the such cached WP data in multiple GM portions of different directors. In at least one embodiment in accordance with techniques herein with host-based mirroring for LLD 920, for each write operation directed to LLD 920, the host 910 may issue two writes of the same write data. A first write is made by host 910 to LLD 920 over one of the paths of 902 whereby the first write is received by primary director 810a, and director 810a stores the write data in a cache location of GM 804a. A second write is made by host 910 to LLD 920 over one of the paths of 904 whereby the second write is received by director 810b, and director 810b stores the write data in a cache location of GM 804b. In such an embodiment, the foregoing first and second writes write the same data in order to provide the mirroring of the write data in GM portions 804a and 804b. The issuance of two duplicate writes for a single original write from an application may be performed in a manner that is automatic and transparent from the point of view of the issuing application. In at least one embodiment with reference back to FIG. 4, an application 212 may issue a single original write I/O operation 214. A driver on the host in the I/O runtime stack 216 may perform additional processing. The additional processing may include checking the original I/O operation to see if it is directed to a target logical device that is a designated LLD. If so, the I/O operation may be sent over a particular path to the designated primary director for the LLD. The additional processing may also include checking the original I/O operation to see if it is a write operation directed to a target logical device that is a designated LLD. If the I/O operation is a write operation, the host may additionally perform processing to issue a second write operation to write the same data (as the first write operation directed to the target logical device). This is described below in more detail.

The host 910 may maintain a list 912 of logical devices which are configured as LLDs. If the original write operation is directed to an LLD, the host may then issue two duplicate writes as noted above—a first write to the LLD 920 over a path of 902 to director 810*a* and a second write to a second logical device over a path of 904 to director 810*b*. The second logical device may be maintained as a mirror of the LLD 920. In at least one embodiment, the second logical device may also be configured as an LLD with director 2 810*b* as its primary director. In this manner, two duplicate writes may be issued to two different logical devices maintained as mirrored copies. In such an embodiment, each of the two write requests may each identify, as a target logical device, a different one of the two logical devices. In at least one such embodiment, both of the logical devices may be LLDs for which the data storage system does not perform mirroring of cached WP data among different GM data portions of different directors. As a further variation, both of the foregoing logical devices may be in the same data storage system but on different engines. As yet a further variation, host-based mirroring may be used in connection with issuing two write I/Os to two logical devices in different data storage systems. In connection with the foregoing alternative mirroring techniques just described, the two duplicate writes may be issued concurrently. Additionally, the host may also perform processing to track whether both of the issued writes have completed prior to returning acknowledgement to the application that the single original write I/O operation issued by the application has completed.

Figure 14:
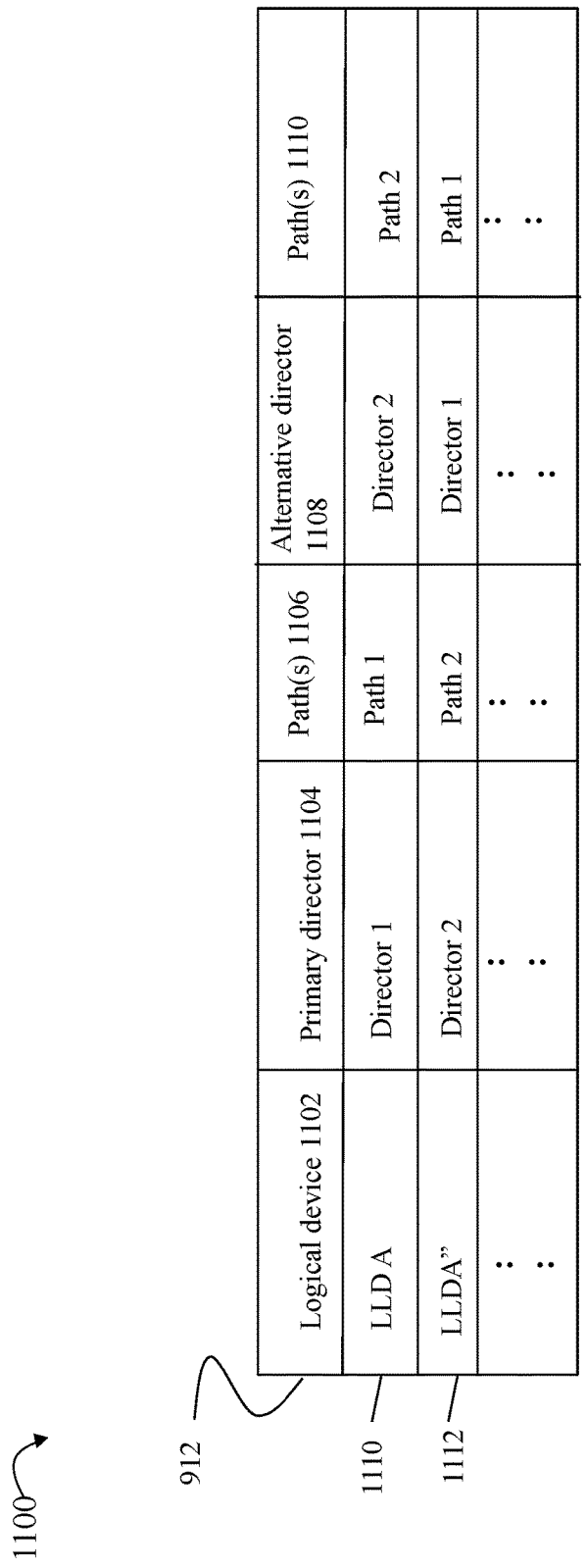
FIG. 14 is an example of information that may be used by the host in an embodiment in accordance with techniques herein.

Referring to FIG. 14, shown is an example illustrating information that may be maintained in a list used by the host in connection with performing techniques herein. The example 1100 is an example of information 912 that may be stored in a tabular or other suitable form on the host for use by a driver of the I/O stack on the host. The driver may receive an I/O operation as described herein and may determine whether the target logical device of the I/O operation is a logical device designated as an LLD. Further, the driver may examine the I/O operation to determine whether the I/O operation is a write operation. If the I/O operation is directed to a logical device designated as an LLD, the driver may perform processing in connection with various techniques as described herein.

Consider a first embodiment where the data storage system automatically performs processing to mirror cached WP data where a first logical device is designated as an LLD referred to as LLD A. Assume in this first embodiment, that the data storage system performs processing to mirror the write data in two cache locations of two different GM portions of two different directors as described above. In this example, the table 912 may include a row or entry for each logical device configured as an LLD. The table 912 may include a first column 1102 identifying the logical devices configured as LLDs, a second column 1104 identifying the primary directors, a third column 1106 identifying one or more paths from the host to the primary directors, a fourth column 1108 identifying alternative directors 1108 (alternative directors to the LLDs) and a fifth column of one or more paths from the host to the alternative directors. Each row or entry corresponds to a set of information for a particular LLD. For example row 1110 indicates that LLD A (column 1102) has a primary director of director 1 (column 1104) with path 1 (column 1106) from the host to the primary director used for issuing I/Os to the primary director. Additionally, director 2 (column 1108) is configured as an alternative director to LLD A where path 2 (column 1110) is a path from the host to director 2. The host may send I/Os (both reads and writes) to LLD A over path 1 between the host and the primary director 1 (where path1 is identified in column 1106). In such an embodiment, the host driver may use information stored in table 912 to determine whether the target logical device of the I/O operation is configured as an LLD. If so, the driver may locate a matching row in table 912 where the target logical device of the write matches a logical device of column 1102 corresponding logical device configured as an LLD. The driver may then select one of the paths 1106 to the primary director 1104 over which to send the I/O operation. The information in columns 1108 and 1110 may be used, for example, responsive to determining the primary director has failed, such as where I/O sent over paths 1106 fail. In such a case, I/Os may be alternatively sent to the alternative director 1108 over one of the paths in 1110. For example, referring back to FIG. 13, row 1110 may denote information in table 912 for LLD 920 where the primary director in column 1104 is director 1 810*a*, the path(s) 1106 may identify the one or more paths 902, the alternative director in column 1108 is director 2 810*b*, and the path(s) 1110 may identifying the one or more paths 904. The host may force I/Os to be sent only over paths 902/1106 to the primary director 810*a*. However, upon failure or unavailability of director 810*a* and/or paths 902/1106, the host may transparently redirect I/Os to LLD A to director 810*b*/1108 over paths 902/1110.

Now consider use of the information in table 912 in another embodiment in which there is host-based mirroring rather than data storage system-based mirroring of write data in multiple GM portions. In such an embodiment, the driver may perform processing as described above in connection with the first embodiment to ensure that all I/Os directed to an LLD are sent over one of the paths to the designated primary director. For example, with host-based mirroring, the driver may determine whether an I/O is directed to a target logical device (e.g., field 260*c* of I/O request of FIG. 5) that is an LLD. If the target logical device of the I/O operation matches a logical device in the table 912 designated as an LLD, then the driver sends the I/O operation over one of the paths 1106 to the primary director 1104 for the LLD. Additionally, the driver determines whether the I/O operation is a write (e.g., 260*a* of FIG. 5) directed to an LLD. If so, the host performs processing to issue a second write operation that writes the same data as the prior write just sent to the LLD. Thus, as described above, the host may issue two write operations for the single original write operation. A first write operation may be issued over a path to the primary director (e.g., one of the paths of 1106 to primary director, director 1 810*a*). Additionally a second duplicate write operation may be issued over a path to second logical device serving as the mirror of the LLD. The host may maintain information, such as in table 912, identifying the second logical device serving as the mirror of the LLD. For example, table 912 includes row 1110 for LLD A and row 1112 including information for the mirror of LLD A, denoted as LLD A". In this example, responsive to determining the I/O operation directed to LLD A is a write, the host driver may perform processing to identify an entry in table 912 corresponding to LLD A". the mirror for LLD A (e.g., such as by examining information in column 1102 of entry 1112) and then issue the second duplicate write in accordance with the information of entry 1112 (e.g. issue the second duplicate write to LLD A's mirror, LLD A" where the second write is sent over path 2 (column 1106) to director 2 (the primary director 1104 for LLD A"). In this manner, the foregoing issuance of the two duplicate writes with host-based mirroring provides for storing the same WP data in cache locations of GM portions 804*a* and 804*b* on the same engine. In this example, both LLD A and its mirror (LLD A") may be configured as LLDs for which host-based mirroring is performed. In the foregoing, the mirror LLD A" is configured as an LLD which has 810*b* as its primary director whereby both LLD A and its mirror LLD A" have, respectively, primary directors 810*a-b* of the same engine. Alternatively, LLD A" may be located on another engine of the same data storage system, or may be located on a different data storage system.

In connection with techniques described herein where the data storage system performs processing to automatically mirror write data in two GM portions, such as mirroring WP data of LLD 920 stored in GM portion 804*a* to another GM portion, such as 804*b*, in the same data storage system, the primary director 810*a* may perform processing to update status information of cached write data mirrored in 804*a* and 804*b* to no longer indicate that such write data is WP once the cached write data has been destaged to physical storage. In at least one embodiment, once the director 810*a* has destaged its copy of WP data of LLD 920 from GM portion 804*a* to physical storage, director 810*a* may communicate over connection 824 to director 810*b* to inform director 810*b* to mark the cache location in GM portion 804*b* including the mirrored write data as no longer WP (whereby the cache location may be available for reuse).

In at least one embodiment, logical devices configured as LLDs may be managed and configured from the host. As needed, commands or configuration information regarding which logical devices are configured as LLDs, which director is designated as a primary director for a particular LLD, and the like, may be communicated from the host to the data storage system (e.g., such as so the data storage system may enable/disable controls and processing for shared/non-shared allocated GM chunks). Such techniques described herein have operations associated with an LLD performed locally by single primary director. Such operations performed locally by the primary director may include allocating cache slots and GM chunks for storing logical device MD from the GM portion that is local to the primary director. Such operations associated with an LLD that are performed locally by single primary director may also include allocating any IU buffers from the GM portion that is local to the primary director. Additionally, since an I/O directed to an LLD is handled by a single primary director, an embodiment in accordance with techniques herein may send an acknowledgement back to the host that a write from the host has completed once the write data is stored in IU buffers. The foregoing may be performed alternatively to waiting to return the acknowledgement to the host until the write data is stored in a cache location of the GM. In at least one embodiment as described herein, write data may be received by the primary director, stored first in an IU buffer and then written from the IU buffer into a cache location. In accordance with techniques herein, the IU buffers for the LLD may be allocated from the GM portion local to the primary director (e.g., GM portion 804*a* local to primary director 810*a* for LLD 920). In such an embodiment, the data storage system may use any suitable technique whereby the IU buffers containing the write data of LLD 920 may be preserved during a power failure. Such techniques may also generally be used in connection preserving or ensuring that any desired data that is stored in a form of volatile memory is saved to a form of non-volatile memory or storage upon the occurrence of a power failure. For example, upon failure of a primary power source, a secondary power source may be provided to the volatile memory for at least an amount of time sufficient to copy any desired data from the volatile memory to a form of non-volatile memory or storage. Only in the case of primary director failure is access to the LLD performed from a different director.

In connection with techniques herein, the host may be responsible for configuring, controlling and directing I/Os directed to an LLD over specified paths to a particular designated single primary director of the data storage system. Upon failure or unavailability of the primary director of an LLD, the LLD may be reconfigured as a non-LLD or regular logical device. With such reconfiguration, the sharing and synchronization control typically used with allocated GM chunks for non-LLD or regular logical devices may now be enabled (since single director access, such as by only the primary director, is no longer guaranteed and such allocated GM chunks may be shared or accessed by multiple directors). Additionally, upon failure or unavailability of the primary director, a different technique may be used to mirror cached WP data for the reconfigured LLD. As described herein for LLDs, WP data stored in cache may be mirrored in different GM portions of different directors on the same engine where the PCI/CMI connection between directors on the same engine may be used to copy the data between such GM data portions of the different directors. With failure or unavailability of the primary director, such data storage system-based or driven mirroring may no longer be performed. As such, an embodiment may use a host-based mirroring technique or, in multiple engine configurations, may have the data storage system perform mirroring of the cached write data as with non-LLD or regular logical devices (e.g., where the mirroring is performed using the IB fabric to mirror the write data on a first GM portion local to a first director and a second GM portion local to a second director, where the first and second directors and first and second GM portions are on different engines.

It should be noted that although embodiments are described herein where only 2 directors are included in a single engine, one of ordinary skill in the art will appreciate that techniques herein may also be more generally and readily applied for use in connection with engines having more than 2 directors.

Described above are examples of techniques herein used in connection with an LLD in connection with cache slots of GM such as may be used for storing write data. Consistent with discussion above, such techniques as described herein also generally provide a benefit in connection with data for read operations directed to the LLD. For example, consistent with discussion above, cache slots for read data are also allocated from GM that is local with respect to the primary director of the LLD and all read operations are directed to the primary director. Thus, a performance benefit may also be obtained in connection with servicing read operations directed to the LLD due to such primary director-local processing and allocation of cache slots from GM local to the primary director.

Figure 15:
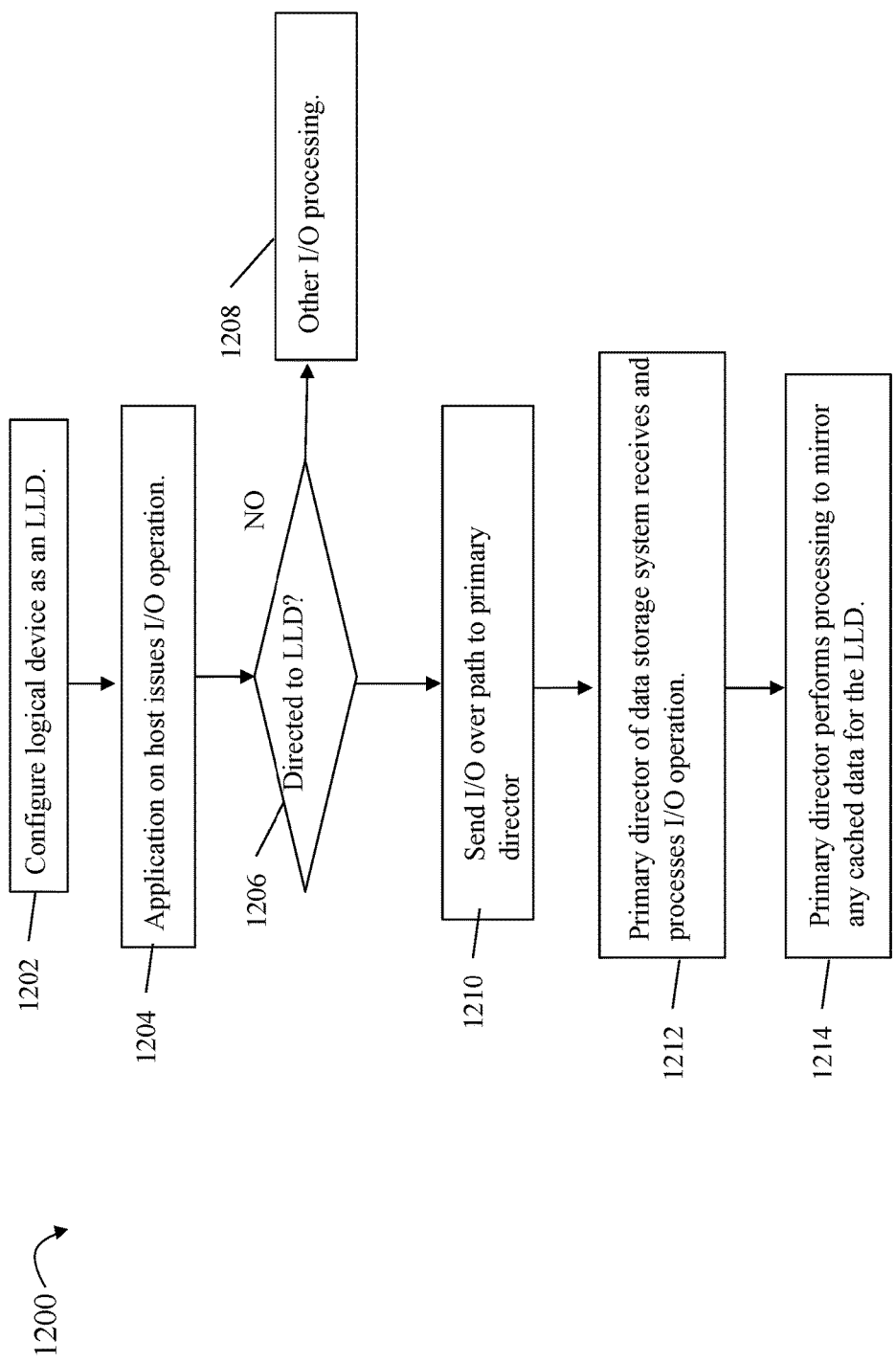
FIGS. 15, 16 and 17 are flowcharts of processing steps that may be performed in an embodiment in accordance with techniques herein.
Figure 16:
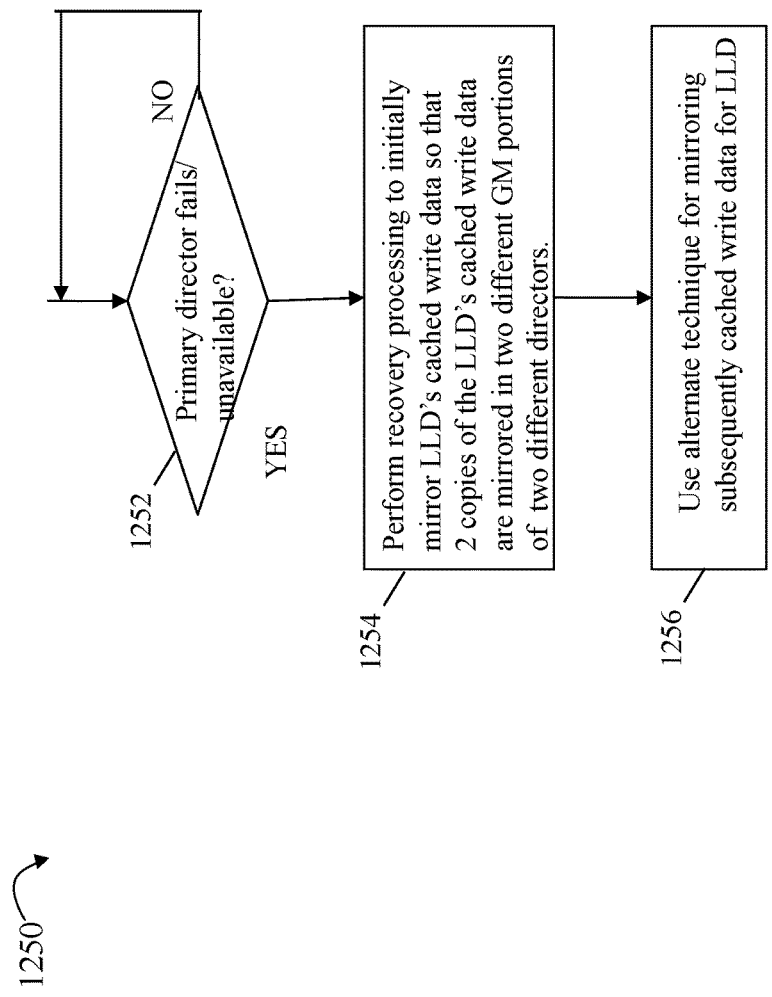
Figure 17:
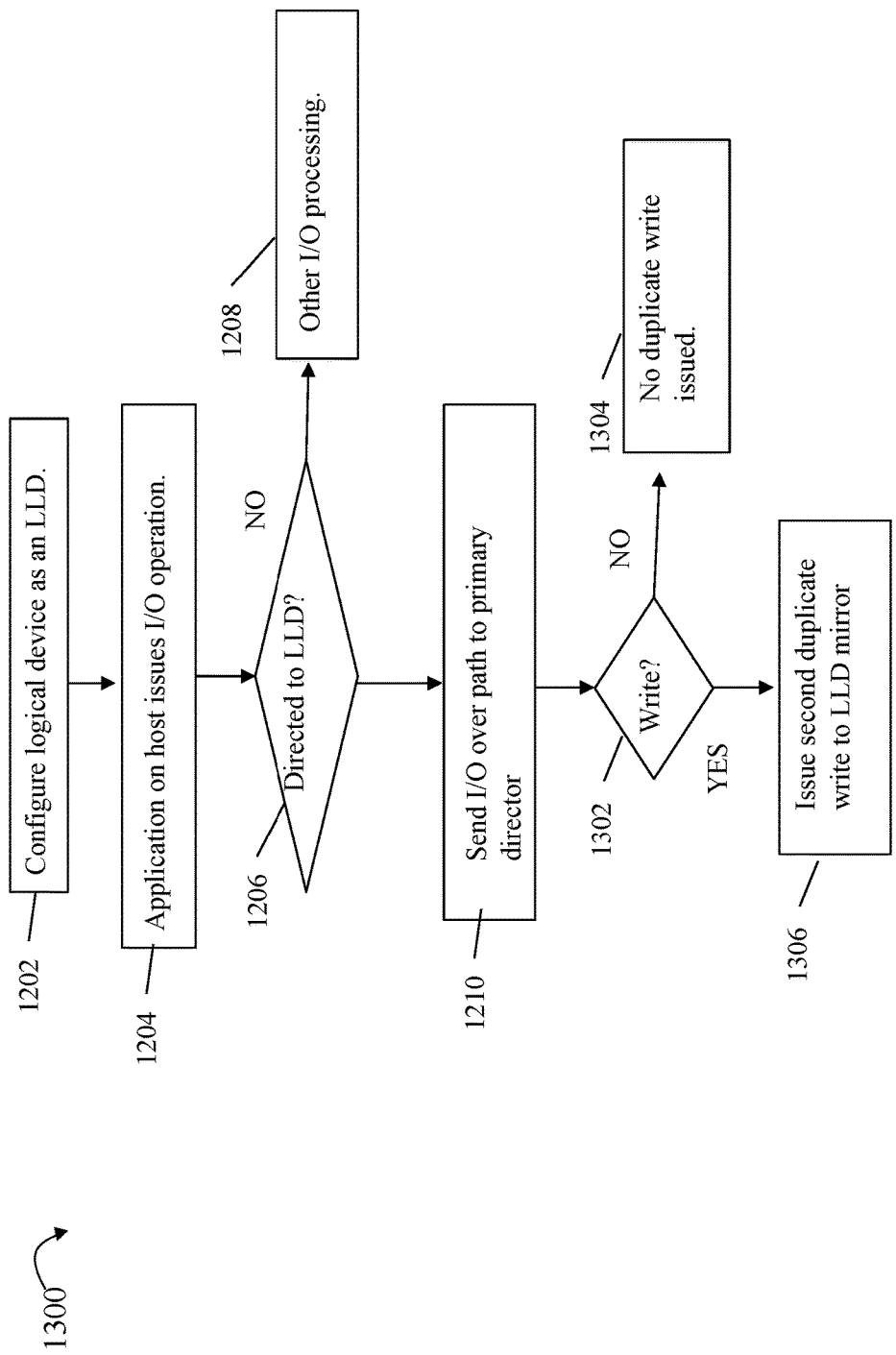

Discussed below in connection with FIGS. 15, 16 and 17 are flowcharts of processing that may be performed in an embodiment in accordance with techniques herein. Such flowcharts summarize processing described above.

Referring to FIG. 15, shown is a first flowchart 1200 of processing steps that may be performed in an embodiment in accordance with techniques herein. The steps of flowchart 1200 may be performed in connection with an embodiment in which the data storage system automatically performs mirroring of cached write data for an LLD. At step 1202, a particular logical device is configured as an LLD. In particular, such configuration as described herein includes designating a primary director for the LLD and performing processing on the host to ensure that I/Os are only directed to paths to the primary director. On the data storage system, the primary director may be configured to perform operations and processing in connection with the LLD locally with respect to the primary director. For example, the primary director may perform cache slot allocations for storing data of the LLD (e.g., for read and write operation data) from GM that is local to the primary director, the physical storage allocated for the LLD may be provisioned from physical storage devices that are attached and accessible directly by the primary director, and the like.

At step 1204, an application on the host may issue an I/O operation. At step 1206, the host, such as by a driver on the host, may determine whether the I/O is directed to an LLD. If step 1206 evaluates to no, control proceeds to step 1208 to perform other non-LLD I/O processing for the I/O operation. If step 1206 evaluates to yes, control proceeds to step 1210 where the host performs processing to ensure that the I/O is sent over a path to the primary director on the data storage system. At step 1212, the primary director of the data storage system receives the I/O operation and performs processing for the I/O operation, such as allocates any needed cache slot from GM local to the director. At step 1214, the primary director performs processing, as may be needed, to mirror any cached data for the LLD. In particular, if the I/O operation is a write operation, step 1214 may include the data storage system mirroring the cached write data for the received I/O operation in a second cache slot in GM that is local to the adjacent director on the same engine as the primary director. Such mirroring may be performed by sending the cached write data over the engine-local PCI/CMI connection between the primary director and its adjacent director on the same engine.

Referring to FIG. 16, shown is a second flowchart 1250 of processing steps that may be performed in an embodiment in accordance with techniques herein. The steps of flowchart 1250 may be performed in connection with an embodiment in which the data storage system automatically performs mirroring of cached write data for an LLD. At step 1252, a determination is made as to whether the primary director for an LLD has failed or is generally unavailable. If step 1252 evaluates to no, control remains at step 1252. If step 1252 evaluates to yes, control proceeds to step 1254 where recovery processing may be performed. At this point of failure, the adjacent director on the same engine as the failed primary director has a single available copy of the cached write data for the LLD. As described herein, such recovery processing may include mirroring the cached write data for the LLD from the GM portion of the adjacent director to cache locations in GM portions local to one or more other directors. Such other directors may be located on one or more engines different from the engine including the failed primary director and adjacent director. Additionally, control proceeds to step 1256 where an alternate technique may be used to mirror the cached write data of the LLD while the LLD's primary director is failed or unavailable to service I/Os for the LLD. As described herein, such alternative techniques may include host-based mirroring of the LLD's cached write data, or reconfiguring the LLD as a non-LLD or regular logical device whereby mirroring of the reconfigured LLD's cached write data may be performed automatically by the data storage system using the IB fabric. If host-based mirroring is performed, I/Os to the LLD may be sent to the alternative director specified for the LLD.

Referring to FIG. 17, shown is a third flowchart 1300 of processing steps that may be performed in an embodiment in accordance with techniques herein. The steps of flowchart 1300 may be performed in connection with an embodiment in which the data storage system does not automatically perform mirroring of cached write data for an LLD. Rather the steps of 1300 may be performed in connection with host-based mirroring of the LLD's cached write data. The steps of the flowchart 1300 are performed by the host. Steps 1202, 1204, 1206, 1208 and 1210 may be performed in a manner similar to that as described in connection with FIG. 15. Additionally, subsequent to performing step 1210, processing proceeds to step 1302 where a determination is made as to whether the I/O directed to the LLD is a write operation. If step 1302 evaluates to no, control proceeds to step 1304 where no duplicate write is issued. Otherwise, if step 1302 evaluates to yes, control proceeds to step 1306 where processing is performed to issue a second duplicate write to the LLD's mirror.

An embodiment may implement the techniques herein using code executed by a processor. For example, an embodiment may implement the techniques herein using code which is executed by a processor. As will be appreciated by those skilled in the art, the code may be stored on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing an I/O operation comprising:
   receiving, on a host, the I/O operation directed to a target location of a logical device having storage provisioned on a data storage system, wherein the data storage system includes a plurality of directors;
   determining, by the host, that the logical device is configured as a high performance logical device; and
   responsive to the host determining that the logical device is configured as a high performance logical device, performing I/O path optimization processing by the host in connection with sending the I/O operation to the data storage system, said I/O path optimization processing performed by the host comprising:
  determining, by the host, a first director of the plurality of directors of the data storage system, wherein the first director is designated as a primary director for the logical device and wherein the primary director locally accesses a first cache location of a cache of the data storage system, wherein the first cache location is used to store cache data for the target location of the logical device, and wherein said determining the first director by the host further includes:
    using, by the host, a cache slot allocation algorithm that maps the target location of the logical device to the first director that is predicted to locally access the first cache location used to store cache data for the target location of the logical device, wherein the cache slot allocation algorithm is also used on the data storage system by each of the plurality of directors to determine particular cache locations used to cache data for different logical addresses for a plurality of logical devices including the logical device; and
  sending the I/O operation from the host to the data storage system over a path, said path being a connection from the host to the first director of the data storage system.

2. The method of claim 1, wherein the target location denotes a logical address or location on the logical device.

3. The method of claim 1, wherein the primary director is a specified one of the plurality of directors of the data storage system that exclusively processes I/O operations directed to the logical device.

4. The method of claim 3, wherein the first cache location is included in a first global memory portion that is local with respect to the first director.

5. The method of claim 4, wherein the data storage system includes a distributed global memory comprising a plurality of global memory portions including the first global memory portion, each of the plurality of directors locally accessing a different one of the plurality of global memory portions, and wherein the cache of the data storage system comprises groups of multiple cache locations, each of the groups of multiple cache locations being included in a different one of the global memory portions.

6. The method of claim 5, wherein memory chunks allocated from global memory for use with the logical device are only allocated from the first global portion of the distributed global memory.

7. The method of claim 6, wherein the primary director is the only one of the plurality of directors that accesses the memory chunks and the controls used in connection with shared or concurrent access to the memory chunks are disabled.

8. The method of claim 6, wherein the primary director is included in a first engine and a second director is also included in the first engine, wherein the plurality of global memory portions of the distributed global memory includes a second global memory portion that is local with respect to the second director, and wherein the data storage system automatically performs processing to mirror first cached write data of the logical device in the first global memory portion and the second global memory portion, wherein the processing includes copying the first cached write data over a first connection used for transferring data between directors and global memory portions of the distributed global memory of the first engine.

9. The method of claim 8, wherein the data storage system include a plurality of engines including the first engine, and a second logical device is not configured as a high performance logical device, wherein the data storage system automatically performs second processing to mirror second cached write data of the second logical device on two different cache locations of two different engines of the plurality of engines, the second processing including copying the second cached write data over a communications fabric connected to each of the plurality of directors and each of the plurality of global memory portions of the distributed global memory.

10. The method of claim 6, wherein the primary director is included in a first engine and a second director is also included in the first engine, wherein the plurality of global memory portions of the distributed global memory includes a second global memory portion that is local with respect to the second director, and wherein host-based processing is performed to mirror first cached write data of the logical device in the first global memory portion and the second global memory portion.

11. The method of claim 1, wherein the data storage system includes the plurality of directors on a plurality of engines, each of the plurality of engines including at least two of the plurality of directors, wherein a first of the engines includes the first director and a second director, and wherein each of the plurality of directors is configured to communicate over a fabric to access a distributed global memory of a plurality of global memory portions, each of the plurality of global memory portions being local to a different one of the plurality of directors.

12. The method of claim 11, wherein each of the plurality of engines includes an engine-local connection used for communication between any of the plurality of directors on said each engine, wherein a first of the plurality of global memory portions is local to the first director and a second of the plurality of global memory portions is local to the second director, and wherein the logical device is configured as a high performance logical device, the data storage system automatically mirroring cached write data of the logical device in the first global memory portion and the second global memory portion, said mirroring including transferring the cached write data of the logical device, as stored in the first global memory portion, over the engine-local connection of the first engine, to the second global memory portion.

13. The method of claim 1, wherein the I/O operation is a write operation that writes first data, wherein the first cache location is included in a first memory that is local to the primary director, wherein the plurality of directors communicate over a communications fabric, and the method comprises:
  duplicating the first data in a second cache location of a second memory, wherein said duplicating includes copying the first data from the first cache location to the second cache location using a first connection rather than the communications fabric, wherein the first connection provides faster data transfer than the communications fabric and wherein the first connection is used to duplicate cached data for logical devices configured as high performance logical devices and wherein the communications fabric is used to duplicate cached data for logical devices not configured as high performance logical devices.

14. The method of claim 1, wherein the host disables the I/O path optimization processing for I/O operations larger than a maximum threshold size.

15. The method of claim 1, further comprising:
   determining, by the host, whether a size of the I/O operation exceeds a specified size of a single cache location on the data storage system; and
   responsive to the host determining the size of the I/O operation exceeds the specified size of a single cache location on the data storage system, performing first processing by the host comprising:
      partitioning the I/O operation into a plurality of I/O operations;
      for each of the plurality of I/O operations, determining, using the cache slot allocation algorithm, one of the plurality of directors predicted to locally access a cache location used to store cache data for said each I/O operation; and
      for each of the plurality of I/O operations, sending said each I/O operation from the host to said one director of the data storage system.

16. A system comprising:
   a processor; and
   a memory including code stored therein that, when executed by the processor, performs a method of processing an I/O operation comprising:
      receiving, on a host, the I/O operation directed to a target location of a logical device having storage provisioned on a data storage system, wherein the data storage system includes a plurality of directors;
      determining, by the host, that the logical device is configured as a high performance logical device; and
      responsive to the host determining that the logical device is configured as a high performance logical device, performing I/O path optimization processing by the host in connection with sending the I/O operation to the data storage system, said I/O path optimization processing performed by the host comprising:
         determining, by the host, a first director of the plurality of directors of the data storage system, wherein the first director is designated as a primary director for the logical device and wherein the primary director locally accesses a first cache location of a cache of the data storage system, wherein the first cache location is used to store cache data for the target location of the logical device, and wherein said determining the first director by the host further includes:
            using, by the host, a cache slot allocation algorithm that maps the target location of the logical device to the first director that is predicted to locally access the first cache location used to store cache data for the target location of the logical device, wherein the cache slot allocation algorithm is also used on the data storage system by each of the plurality of directors to determine particular cache locations used to cache data for different logical addresses for a plurality of logical devices including the logical device; and
         sending the I/O operation from the host to the data storage system over a path, said path being a connection from the host to the first director of the data storage system.

17. A non-transitory computer readable medium comprising code stored thereon, that, when executed, performs a method of processing an I/O operation comprising:
   receiving, on a host, the I/O operation directed to a target location of a logical device having storage provisioned on a data storage system, wherein the data storage system includes a plurality of directors;
   determining, by the host, that the logical device is configured as a high performance logical device; and
   responsive to the host determining that the logical device is configured as a high performance logical device, performing I/O path optimization processing by the host in connection with sending the I/O operation to the data storage system, said I/O path optimization processing performed by the host comprising:
      determining, by the host, a first director of the plurality of directors of the data storage system, wherein the first director is designated as a primary director for the logical device and wherein the primary director locally accesses a first cache location of a cache of the data storage system, wherein the first cache location is used to store cache data for the target location of the logical device, and wherein said determining the first director by the host further includes:
         using, by the host, a cache slot allocation algorithm that maps the target location of the logical device to the first director that is predicted to locally access the first cache location used to store cache data for the target location of the logical device, wherein the cache slot allocation algorithm is also used on the data storage system by each of the plurality of directors to determine particular cache locations used to cache data for different logical addresses for a plurality of logical devices including the logical device; and
      sending the I/O operation from the host to the data storage system over a path, said path being a connection from the host to the first director of the data storage system.

18. The non-transitory computer readable medium of claim 17, wherein the logical device is configured as a high performance logical device and the primary director is the only one of the plurality of directors that receives and processes I/O operations, directed to the logical device, from the host, whereby the host performs processing to send the I/O operations directed to the logical device only to the primary director.

19. The non-transitory computer readable medium of claim 18, wherein memory chunks allocated from global memory for use with the logical device are only allocated from a first global portion of a distributed global memory of the data storage system, wherein the first global portion is memory that is locally accessible to the primary director.

20. The non-transitory computer readable medium of claim 19, wherein cached write data for the logical device is stored in the first global portion and first processing is performed to mirror the cached write data for the logical device, wherein the first processing includes any of:
   performing automated processing by the data storage system to mirror the cached write data for the logical device in a second global memory portion of the distributed global memory, wherein the second global memory portion is locally accessible to a second director in a same engine as the primary director and wherein the cached write data is copied to the second global memory portion over a first engine-local connection between the primary director and the second director; and performing host-based mirroring in which the host performs processing to mirror the cached write data for the logical device.

21. The non-transitory computer readable medium of claim 20, wherein automated processing is performed by the data storage system to mirror the cached write data for the logical device in the second global memory portion, and, upon failure of the primary director, the host sends subsequent I/Os that are directed to the logical device over one or more other paths to the second director, and wherein second processing is performed to mirror cached write data of the subsequent I/Os, said second processing including performing host-based mirroring, or reconfiguring the logical device as a regular logical device whereby cached write data is mirrored in cache locations of one or more global memory portions across multiple engines.

* * * * *